US012478270B2

(12) United States Patent
Lia et al.

(10) Patent No.: US 12,478,270 B2
(45) Date of Patent: Nov. 25, 2025

(54) ECONOMICAL, ENVIRONMENTALLY FRIENDLY, DISPOSABLE BLOOD PRESSURE CUFFS AND METHOD OF MANUFACTURING

(71) Applicant: Welch Allyn, Inc., Skaneateles Falls, NY (US)

(72) Inventors: Raymond A. Lia, Skaneateles Falls, NY (US); Robert L. Vivenzio, Auburn, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 783 days.

(21) Appl. No.: 17/079,145

(22) Filed: Oct. 23, 2020

(65) Prior Publication Data
US 2021/0127995 A1   May 6, 2021

Related U.S. Application Data

(60) Provisional application No. 62/931,263, filed on Nov. 6, 2019.

(51) Int. Cl.
*A61B 5/022*    (2006.01)
*B29C 65/08*   (2006.01)
(Continued)

(52) U.S. Cl.
CPC .......... *A61B 5/02233* (2013.01); *B32B 27/10* (2013.01); *B32B 27/32* (2013.01);
(Continued)

(58) Field of Classification Search
CPC ............ A61B 5/02233; A61B 2560/04; A61B 2562/12; B32B 27/10; B32B 27/32; B32B 2535/00; B29C 65/08
See application file for complete search history.

(56) References Cited

U.S. PATENT DOCUMENTS 3,473,525 A * 10/1969 Hanafin ............. A61B 5/02233
                                                                    600/499
3,757,772 A *  9/1973 Goldblat ............ A61B 5/02233
                                                                    181/131
(Continued)

FOREIGN PATENT DOCUMENTS

WO   WO2012078235 A1    6/2012
WO   WO2013028606 A2    2/2013

OTHER PUBLICATIONS

Extended European Search Report mailed Apr. 1, 2021 for European Patent Application No. 20203650.5, 9 pages.

*Primary Examiner* — Justin Xu
(74) *Attorney, Agent, or Firm* — Lee & Hayes, P.C.

(57) ABSTRACT

A low-cost blood pressure cuff includes a bladder assembly comprised of a flexible inner layer of a first material and a flexible outer layer of a second material. The first and second materials are weldable to each other. A top sheet has a first portion that overlies the outer layer and a tail portion extending longitudinally from the first portion. The third portion is comprised of a third material that is not weldable to itself. A perimetric bladder weld joint joining the inner layer, the outer layer, and the top sheet to each other. An enhanced embodiment of the cuff includes a bottom sheet having at least a first portion which underlies the inner layer and which is comprised of a fourth material which is not weldable to itself. The bladder weld joint extends into the bottom sheet thereby joining the bottom sheet to at least the inner layer.

13 Claims, 19 Drawing Sheets

(51) Int. Cl.
  *B32B 27/10*  (2006.01)
  *B32B 27/32*  (2006.01)

(52) U.S. Cl.
  CPC ........... *A61B 2560/04* (2013.01); *B29C 65/08* (2013.01); *B32B 2535/00* (2013.01)

(56) References Cited

U.S. PATENT DOCUMENTS

| | | | | |
|---|---|---|---|---|
| 5,193,549 | A | * | 3/1993 | Bellin ................. A61B 5/02233 600/490 |
| 5,660,182 | A | * | 8/1997 | Kuroshaki ......... A61B 5/02233 600/499 |
| 5,678,558 | A | | 10/1997 | Johnson |
| 8,070,699 | B2 | * | 12/2011 | Avitable ............... A61H 9/0092 601/151 |
| 2001/0005777 | A1 | * | 6/2001 | Nakagawa ............. A61B 5/021 600/499 |
| 2006/0058688 | A1 | * | 3/2006 | Kishimoto ......... A61B 5/02233 600/490 |
| 2007/0244506 | A1 | | 10/2007 | McEwen et al. |
| 2013/0053707 | A1 | * | 2/2013 | Mirisoloff .......... A61B 5/02233 600/499 |
| 2013/0053708 | A1 | * | 2/2013 | Quinn ................. A61B 5/6831 600/499 |
| 2017/0143217 | A1 | * | 5/2017 | Ashida ............... A61B 5/02233 |
| 2019/0104950 | A1 | * | 4/2019 | Mori ................. A61B 5/02225 |

* cited by examiner

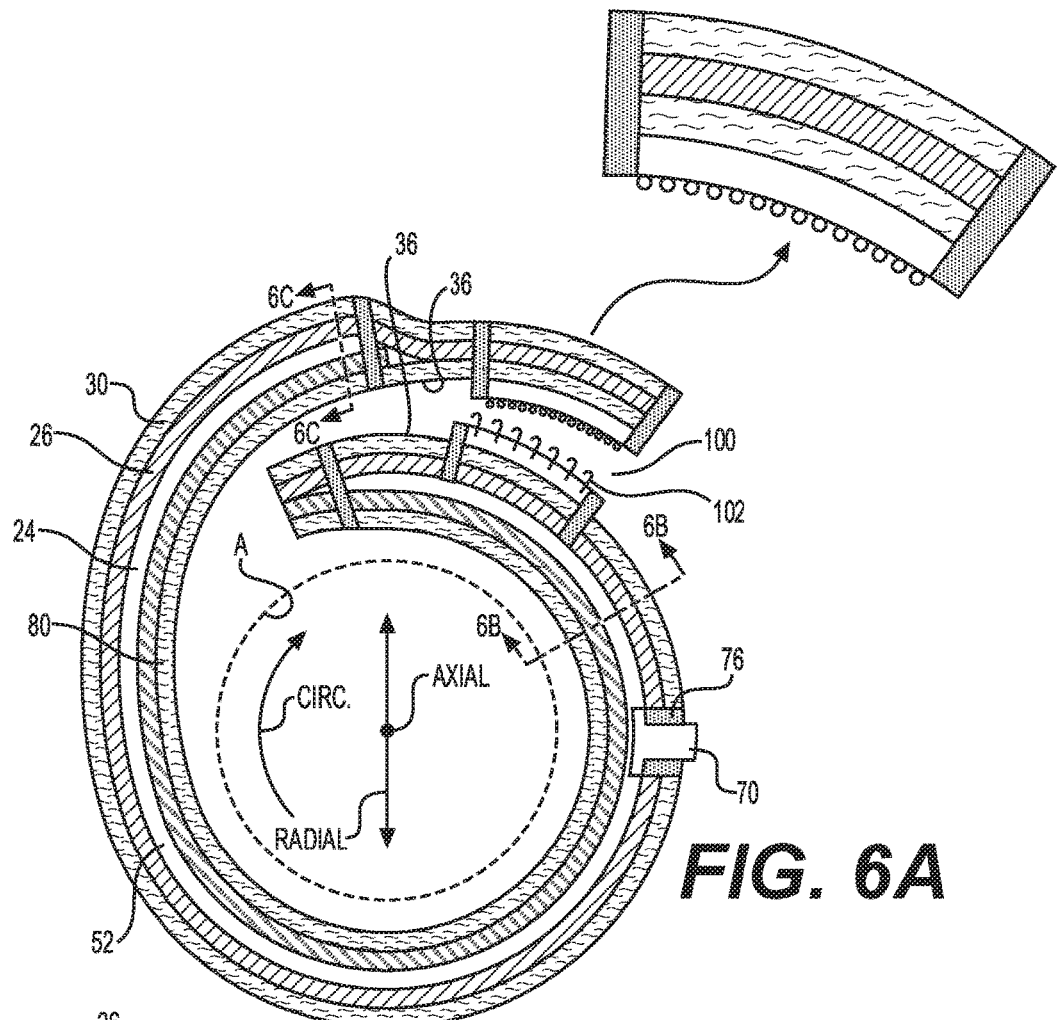
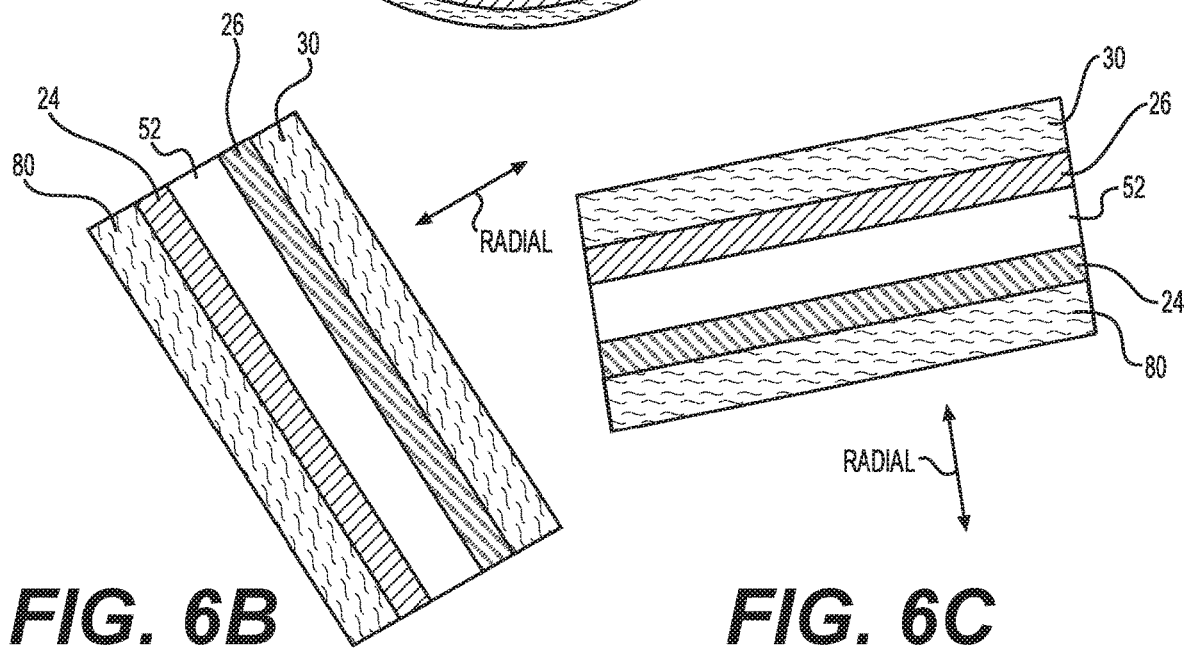
FIG. 6A
FIG. 6B
FIG. 6C

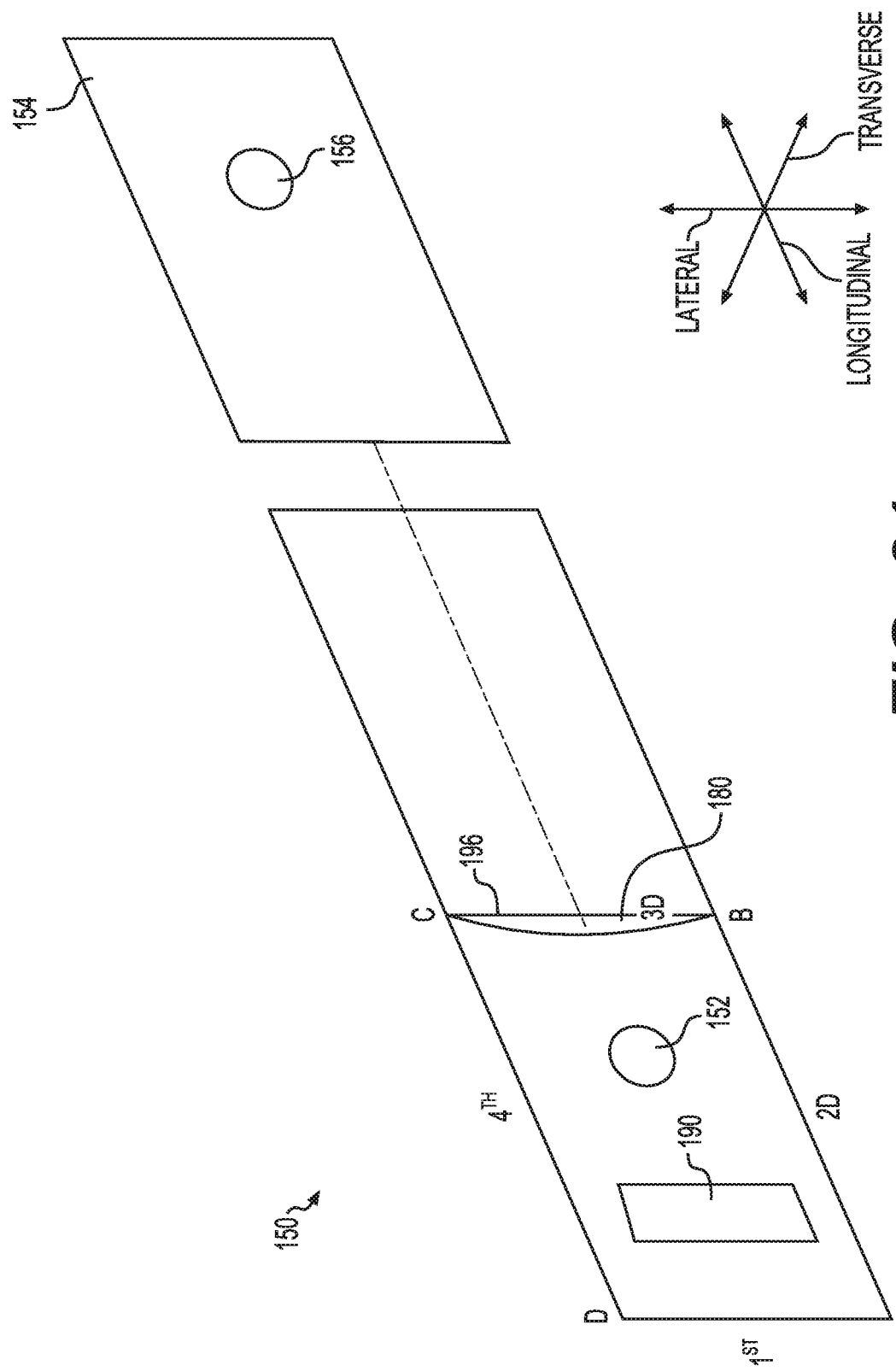

ECONOMICAL, ENVIRONMENTALLY FRIENDLY, DISPOSABLE BLOOD PRESSURE CUFFS AND METHOD OF MANUFACTURING

CROSS REFERENCE TO RELATED APPLICATIONS

The present application claims priority to and the benefit of U.S. Provisional Patent Application No. 62/931,263, titled "Economical, Environmentally Friendly, Disposable Blood Pressure Cuffs and Method of Manufacturing," filed Nov. 6, 2019, which is incorporated herein by reference in its entirety.

TECHNICAL FIELD

The subject matter described herein relates to blood pressure cuffs and particularly to a low-cost cuff which is environmentally friendly despite being disposable.

BACKGROUND

In the medical arts a patient's blood pressure is often measured with a blood pressure measurement apparatus that includes a cuff having an air-pressurizable bladder, devices to pressurize and depressurize the bladder with ambient air, and a gauge for displaying the air pressure within the bladder. The pressurizable bladder of conventional blood pressure cuffs may be made of vinyl. In many ways, vinyl is well suited to the purpose. For example, vinyl is somewhat comfortable to the patient, and strong enough to withstand the pressurization required to take a blood pressure measurement. In addition, vinyl is nonporous and can be heat welded to itself in order to form the pressure containment bladder. Suitable heat welding techniques include ultrasonic welding and radio frequency (RF) welding. One disadvantage of vinyl is that if the cuff is burned after being disposed of, the vinyl emits hazardous gasses. As a result, the use of vinyl is becoming progressively less acceptable in environmentally conscious regions of the world.

Some blood pressure cuffs are designed to be reusable, i.e. to be used on patient after patient without being sanitized between uses. Such reuse carries the risk of patient to patient contamination. Therefore, cuffs that are economical enough to be disposed of after a single use are desirable if the above mentioned release of hazardous gases resulting from post-disposal burning can be mitigated. As used herein, single use means use confined to a single patient even though more than one blood pressure measurement may be taken from that patient. By contrast, multiple use or reusable means use on two or more patients, even if only one measurement is taken from each of those patients.

Certain soft fibrous materials, including certain "paper-like" materials, are less expensive and cleaner burning than vinyl. "Paper-like" materials can be more comfortable than vinyl due to their soft, fibrous nature. "Paper like" materials also can absorb moisture (e.g. perspiration) from the patient's skin and are breathable. These materials are also strong in tension. However, such materials cannot be heat welded to themselves in the way that vinyl can be in order to form the pressure containment bladder. Even if some other joinery technique were used to form the bladder, the porosity of paper would cause it to be unable to hold the air pressure required to take a blood pressure measurement. Therefore, such materials, standing alone, do not suggest themselves as a viable alternative to vinyl.

Other materials, for example polyethylene and polypropylene, burn more cleanly than vinyl and are less expensive than vinyl. Unlike the above mentioned paper like materials, other materials may also have the advantages of being nonporous, and can be heat welded to themselves. Polyethylene and polypropylene are cost effective materials but may not be as comfortable to the patient as vinyl. They are also weak under tension so that if formed into a bladder and pressurized the bladder will tend to expand like a balloon. Accordingly, polyethylene and polypropylene standing alone do not suggest themselves as an alternative to vinyl, and do not suggest themselves for use in the construction of a comfortable cuff economical enough to be disposed of after a single use.

Other alternatives to vinyl include soft plastic films laminated to a paper like material across essentially their entire surfaces. However, the resulting finished product is semi-rigid, rather than soft, and therefore is uncomfortable to the patient.

Therefore, it is desirable to overcome the problem of producing a blood pressure measurement cuff which is environmentally satisfactory, acceptably comfortable to the patient, and sufficiently economical to be disposed of after a single use.

SUMMARY

A construction disclosed herein uses "paper-like" material for outer tensile strength and polyethylene or polypropylene for welding the bladder with a periphery seal and impregnating the weld into the "paper-like" material to mechanically hold the entire structure together. A blood pressure cuff disclosed herein includes the combination of "paper-like" fibrous material and films of polyethylene or polypropylene or other material which is weldable to itself to form a blood pressure cuff that is soft and comfortable, strong in tension and can form a pressure bladder chamber. This is accomplished by using the weldability of the polyethylene, polypropylene or other material to itself and its ability to flow into the "paper-like" material to for mechanical bonds and hold the entire structure together.

In particular, the blood pressure cuff disclosed herein includes a bladder assembly comprised of a flexible inner layer of a first material and a flexible outer layer of a second material. The first material and the second material are weldable to each other. The cuff also includes a top sheet having a first portion that overlies the outer layer and a tail portion extending longitudinally from the first portion. The first portion is comprised of a third material that is not weldable to itself. The cuff also includes a bladder weld joint extending along the perimeter of the first portion of the top sheet thereby joining the inner layer, the outer layer, and the top sheet to each other.

BRIEF DESCRIPTION OF THE DRAWINGS

The foregoing and other features of the various embodiments of the blood pressure cuff described herein will become more apparent from the following detailed description and the accompanying drawings in which:

FIG. 6A is a nonexploded schematic view of the cuff of FIG. 5 wrapped around the limb of a patient.

FIGS. 6B and 6C are cross sections taken at 6B-6B and 6C-6C of FIG. 6A.

FIG. 21 is a schematic, perspective view of a jacket similar to that of FIG. 19 having only an end opening proximate to a tail portion of the jacket.

DETAILED DESCRIPTION

Figure 1:
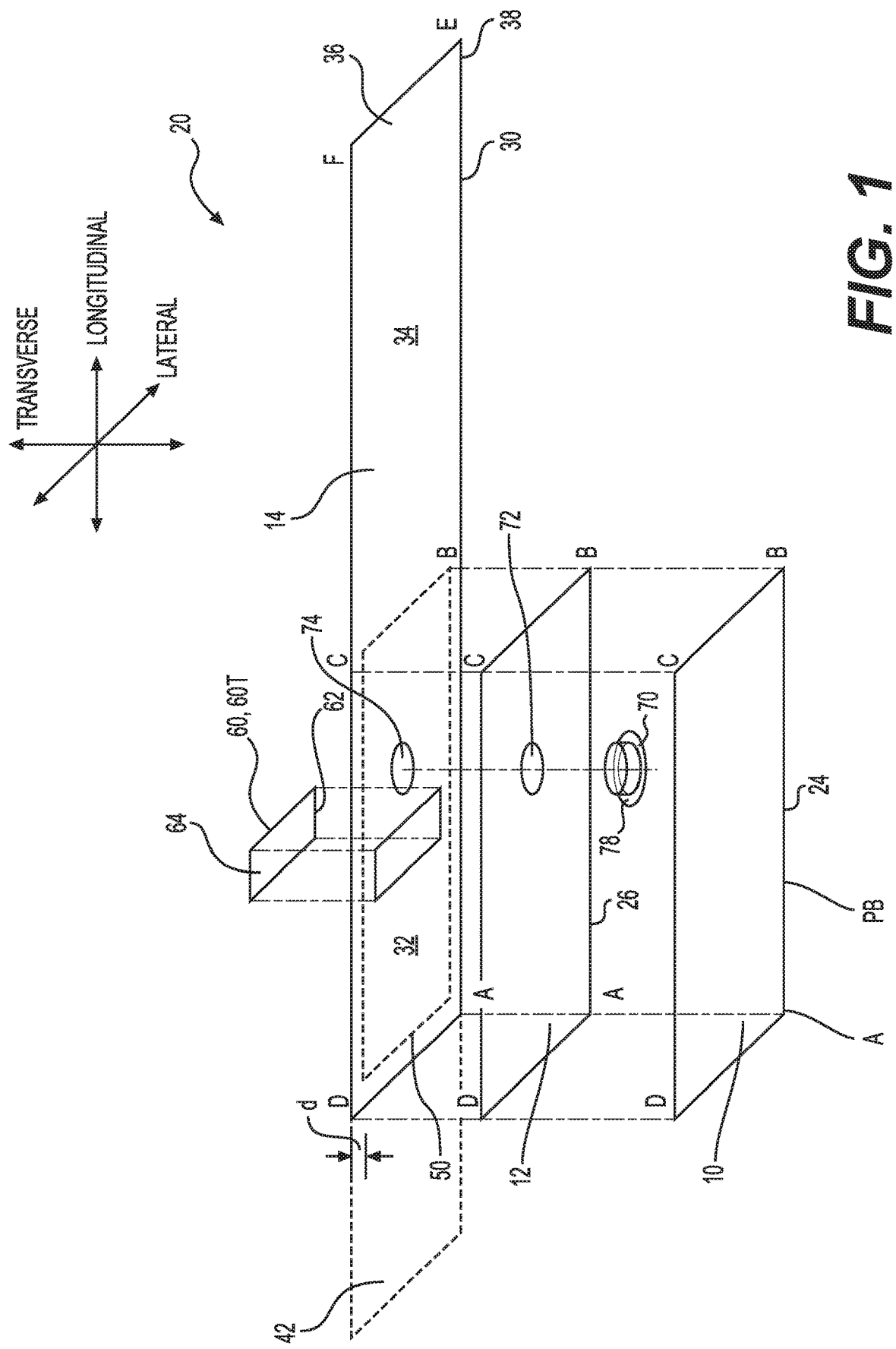
FIG. 1 is a schematic, exploded perspective view of an embodiment of a low-cost blood pressure cuff.

The present invention may comprise one or more of the features recited in the appended claims and/or one or more of the following features or combinations thereof.

In this specification and drawings, features similar to or the same as features already described may be identified by reference characters or numerals which are the same as or similar to those previously used. Similar elements may be identified by a common reference character or numeral, with suffixes being used to refer to specific occurrences of the element.

Figure 2:
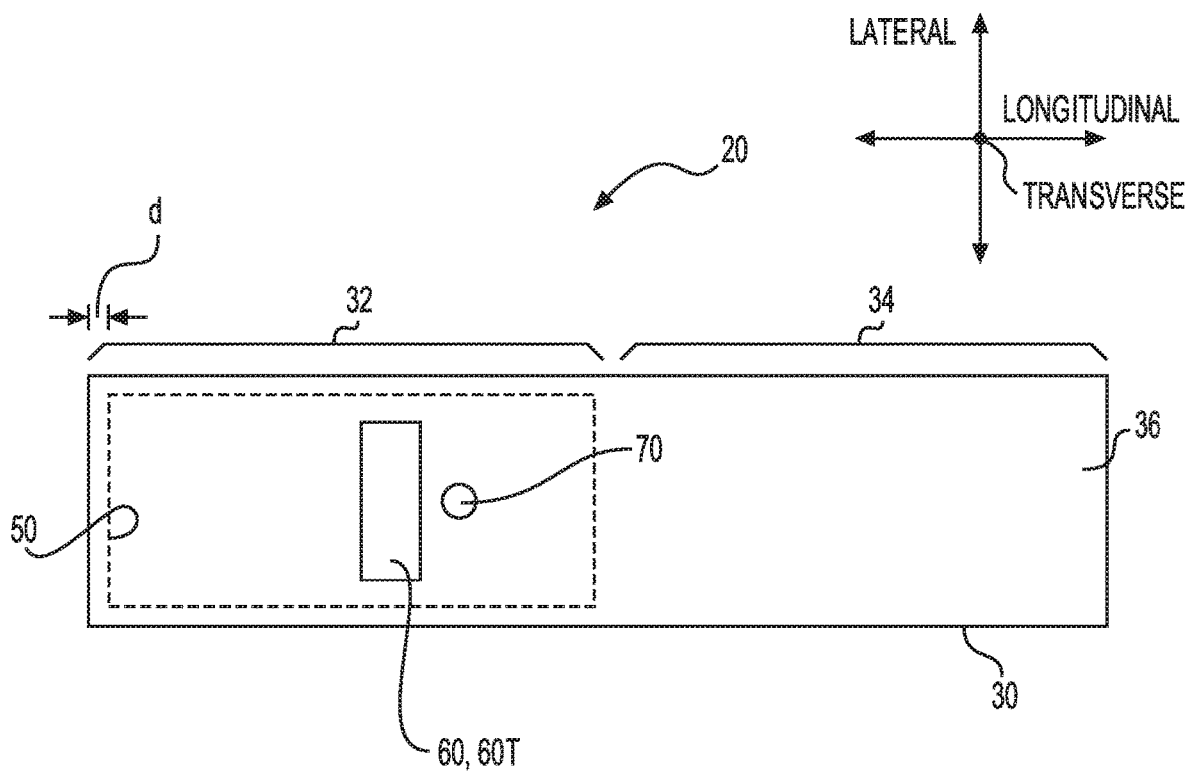
FIG. 2 is a top plan view of the cuff of FIG. 1.
Figure 3:
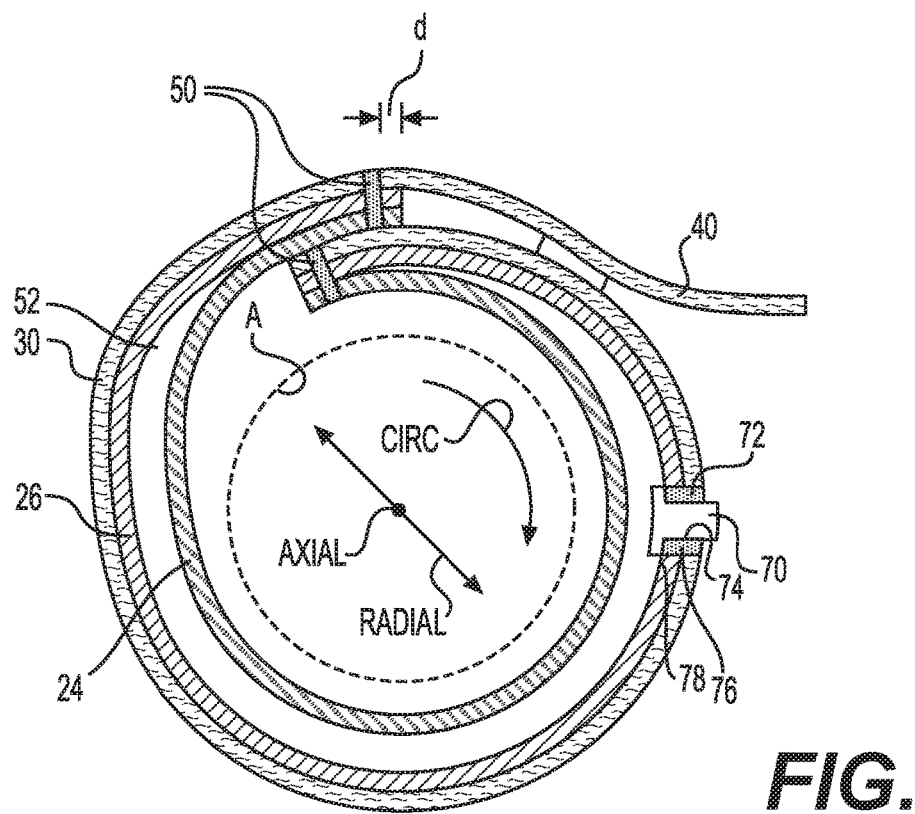
FIG. 3 is a schematic view of the cuff wrapped around the limb of a patient.

FIGS. 1-3 show a blood pressure cuff 20 which extends longitudinally, laterally, and transversely as indicated by the axes included on the illustration. FIG. 1 depicts an exploded view of the blood pressure cuff 20. FIG. 2 depicts the blood pressure cuff 20 from a perspective that is perpendicular to the lateral and longitudinal axis of the blood pressure cuff 20. FIG. 3 depicts a cross section of the blood pressure cuff 20 wrapped around a patient's limb. It should be noted that when blood pressure cuff 20 is wrapped around a patient's limb in order to take a blood pressure measurement, as seen in FIG. 3, it may be more natural to refer to the longitudinal, lateral, and transverse directions as circumferential, axial (e.g., limbwise), and radial directions respectively. Nevertheless, the directional terms from either set of coordinates may be used irrespective of whether the cuff is laid flat as in FIGS. 1-2 or wrapped as in FIG. 3. The transverse (radial) dimension of the cuff or its components may be referred to as "thickness".

The cuff includes an inflatable (and deflatable) bladder assembly comprised of a flexible, sheet-like inner layer 24 of a first material 10 and a flexible, sheet-like outer layer 26 of a second material 12. The layers are referred to as "inner and "outer" because of their relative radial relationship when wrapped as seen in FIG. 3.

In some embodiments, the first material 10 and the second material 12 may be weldable to each other by a heat welding technique such as ultrasonic welding or radio frequency (RF) welding. For example, one or both of the first material 10 and/or the second material 12 may be a thin film thermoplastic. In at least one example, one or both of the first material 10 and/or the second material 12 may be a polyolefin. In at least one additional embodiment, one or both of the first material 10 and/or the second material 12 may be polypropylene. In another embodiment, one or both of the first material 10 and/or the second material 12 may be polyethylene. In another embodiment, one or both of the first material 10 and/or the second material 12 may be a blend of polyethylene and polypropylene. In another embodiment, the first material 10 used to construct inner layer 24 and the second material 12 used to construct outer layer 26 can be the same material.

The cuff can also include a top sheet 30 having a top surface 36 and a bottom surface 38. The top sheet includes a first portion 32 that overlies the outer layer. The top sheet may also have a tail portion 34 extending longitudinally from the first portion. At least the first portion is made of a third material 14. The tail portion may also be made of the third material 14. The third material 14 can be a material that is not weldable to itself via the heat welding technique. The third material 14 may also have the attribute of being a material that the first material 10 and/or the second material 12 can be welded into but which does not melt in response to the first material 10 and/or the second material 12 being welded into it. Other desirable attributes of the third material 14 are softness (so that embodiments of the cuff in which the third layer contacts the patient's skin are comfortable to the patient), low-cost, and environmental friendliness. Because the cuff is intended to be disposable, another desirable attribute of the third material 14 is that it give the user the impression of being disposable. As a result, the user is neither tempted to re-apply the cuff to a second patient after having used it for a first patient, nor concerned about disposing of it after having removed it from the first patient.

In at least one embodiment, the third material 14 can be at least partially comprised of paper pulp. In at least one embodiment, the third material 14 can be comprised approximately of 40% to 70% paper pulp with the balance being polyethylene and/or polyester fibers 40. In another embodiment, the third material 14 is comprised approximately of 50% to 60% paper pulp with the balance being polyethylene and/or polyester fibers. One example of a suitable third material 14 is a creped spun lace material. One specific example of a creped spun lace material is Pro Towel, in particular Pro Towel 93141. (To Applicant's knowledge, the name Pro Towel need not be accompanied by a "™" or ® symbol.)

A perimetric bladder weld joint 50 may join inner layer 24, outer layer 26, and top sheet 30 to each other. In particular, the bladder weld joint is referred to as perimetric because it extends along the perimeters PB of the inner and outer layers defined by rectangle ABCD. Additionally, the perimetric bladder weld joint 50 may extend along part of the perimeter of the top sheet 30. For example, the perimetric bladder weld joint 50 may be formed in a U-shape, wherein the perimetric weld joint 50 may extend partly along one laterally extending end AD of the cuff, partly along longitudinally extending edge AE (specifically from A to B), and partly along longitudinally extending edge DF specifically from D to C. The remainder of the bladder weld joint extends laterally across the cuff (BC) to connect the ends of the U-shape. As used herein, "perimeter" need not be at the actual edges of the finished product, but may be offset slightly from the actual edges by a small amount d. Because of the offset the edge of the cuff is a relatively soft "comfort edge". This is in contrast with the weld joint itself which is more rigid and stiff and therefore more likely to annoy the patient if it were at the actual edges of the cuff.

The reader should understand that because FIG. 1 is an exploded view, feature 50 is, strictly speaking, a depiction of the location of the weld joint rather than the weld joint itself.

The space transversely between the inner layer 24 and outer layer 26 within the boundary of the bladder weld joint is a pressurizable compartment 52 which is wrapped around a patient's limb (typically the patient's upper arm A) and which, when pressurized, collapses an artery to enable determination of the patient's blood pressure.

Figure 4:
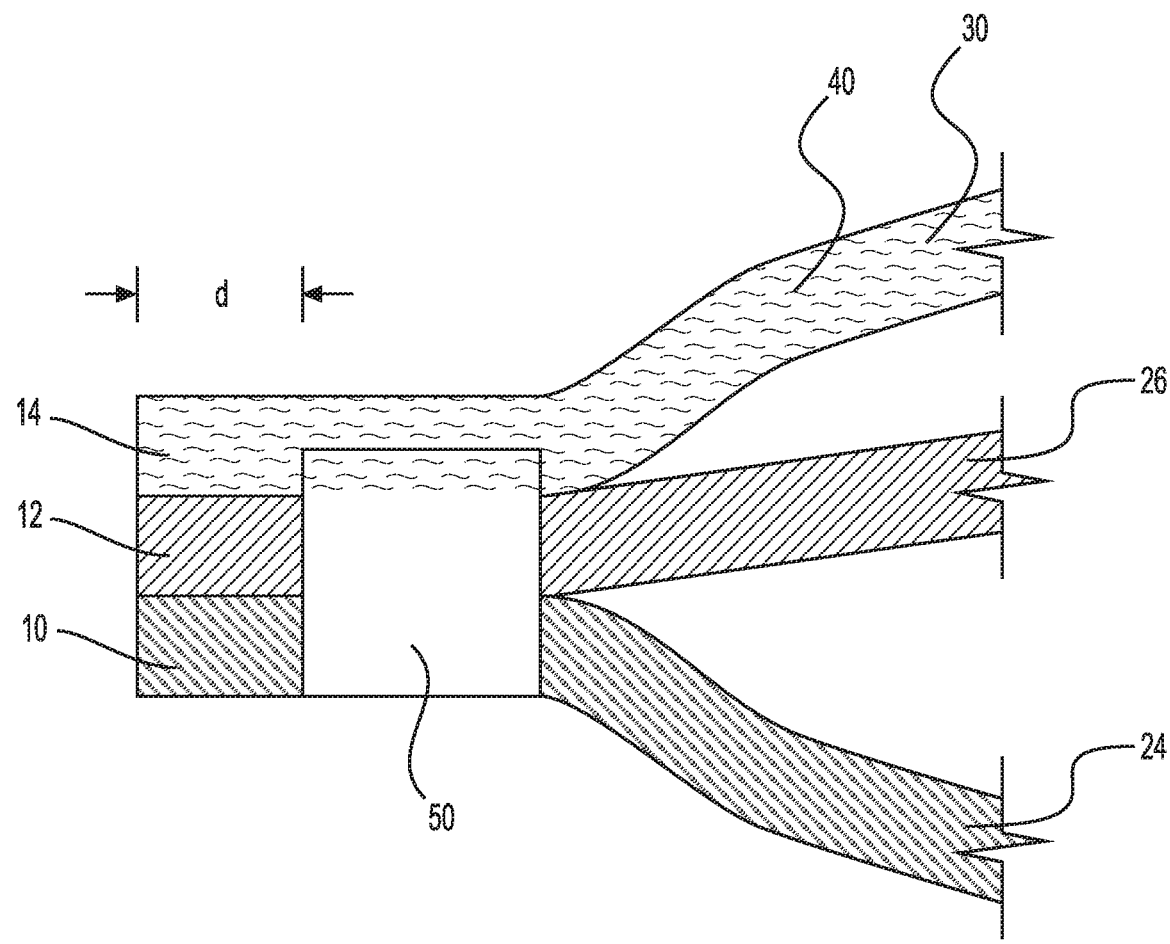
FIG. 4 is a magnified schematic view of a weld joint used to in the manufacture of the cuff.

Bladder weld joint 50 extends transversely into the top sheet by reason of at least the second material 12 melting into the top sheet 30 during formation of the bladder weld joint. FIG. 4 is a magnified schematic view of the weld joint to show how the weld joint causes a local loss of distinctness between the inner and outer layers and that the material of at least the outer layer has melted into, or impregnated, or become embedded in, or formed a matrix with the pulp and fibers of the top sheet 30 (third material 14). As used herein, the notion of "melting into" includes both the case where the melted material extends only partially into the thickness of the third material 14 as depicted in FIG. 4, and the limit case in which the melted material extends across the entire thickness of the material laminations as suggested in FIGS. 3, 6A and 7-9. The third material 14 (top sheet 30) does not melt, or is at least melt resistant, under conditions conducive to melting the first material 10 and the second material 12 in order to join the inner layer 24 and the outer layer 26.

The cuff also includes a closure assembly 60 adapted to hold the cuff in a sleeve configuration. In one or more embodiments of FIGS. 1-3, the closure assembly 60 is depicted as a patch of tape 60T. The tape has an inner adhesive side 62 which adheres to the first portion 32 of the top sheet 30 and an outer adhesive side 64 which is adapted to adhere to the tail portion 34 of the top sheet 30 to maintain the cuff in a sleeve configuration, as seen in FIG. 3, in which top sheet 30 is radially outboard of the inner layer 24 and the outer layer 26. In another embodiment, the closure element 60 is a patch of adhesive residing on only one of A) the top surface 36 of the first portion 32 of the top sheet 30, and B) the bottom surface 38 of the tail portion 34 of the top sheet 30. The patch need not be a double-sided adhesive but instead may be a patch of adhesive integrated into the top sheet 30.

Alternatively the closure assembly 60 can comprise a first closure element and a second closure element. For example, one of the first closure element and/or the second closure element can be provided on the top surface 36 of top sheet 30 at a location analogous to the location of tape 60T. The other closure element can be provided on the bottom surface 38 of top sheet 30 near edge EF. The first closure element and the second closure element can be patches of tape, hook and loop elements of a hook and loop closure assembly, or any other suitable closure elements.

The cuff also includes a port 70 projecting through a bladder opening 72 in outer layer 26 and through a top sheet opening 74 in first portion 32 of top sheet 30. Suitable materials that the port 70 can be made from include polyethylene and polypropylene. The port 70 is welded to the inner layer 24 at a port weld joint 76 that extends into the first portion 32 of the top sheet 30. In the illustrated embodiment the port 70 includes a flange 78, and the port 70 is welded to the inner layer 24 at the flange 78. The port 70 may be permanently connected to tubing, not shown, which permits a pressurizing medium, typically ambient air, to be forced into and exhausted from compartment 52. In such an arrangement the tubing can be considered to be an element of the blood pressure cuff 20. The blood pressure cuff 20 is wrapped around the patient's limb to take a blood pressure measurement, and is removed from the patient after the measurement is complete. Alternatively, the port 70 may be a "stand alone" port, as illustrated. A blood pressure cuff 20 that comprises a stand alone port remains on the patient's arm for an extended time and is connected to and disconnected from the tubing each time a blood pressure measurement is made. In other words, the blood pressure cuff 20 can remain with the patient.

In some embodiments, the blood pressure cuff 20 and variants thereof described in connection with FIGS. 1-3 can be a low-cost or "economy" cuff that exhibits certain advantages in comparison to conventional cuffs. The paper-like top sheet is less expensive and cleaner burning than vinyl. The inner layer 24 and the outer layer 26 provide pressure containment capability that would not be readily achievable if the cuff were to be made exclusively or extensively of the paper-like material. Moreover, manufacturing is facilitated because the first material 10 of the inner layer 24 and the second material 12 of the outer layers 26 can be weldable to each other and can be weldable into and through the third material 14 of the top sheet 30. This is in contrast to a cuff made exclusively or extensively of paper which may require the use of more expensive joinery techniques. The double adhesive tape 60T used as a closure assembly is also inexpensive and therefore contributes to the cost effectiveness and disposability of the cuff.

Notwithstanding the advantages of the above described cuff, some consumers may be prepared to purchase a higher cost cuff in order to avoid certain aspects of the low-cost cuff which they may find objectionable. One possible objectionable feature of the low-cost cuff is that the first material 10

(inner layer 24) contacts the patient's skin, and may be less comfortable than the vinyl material used in conventional cuffs.

Figure 5:
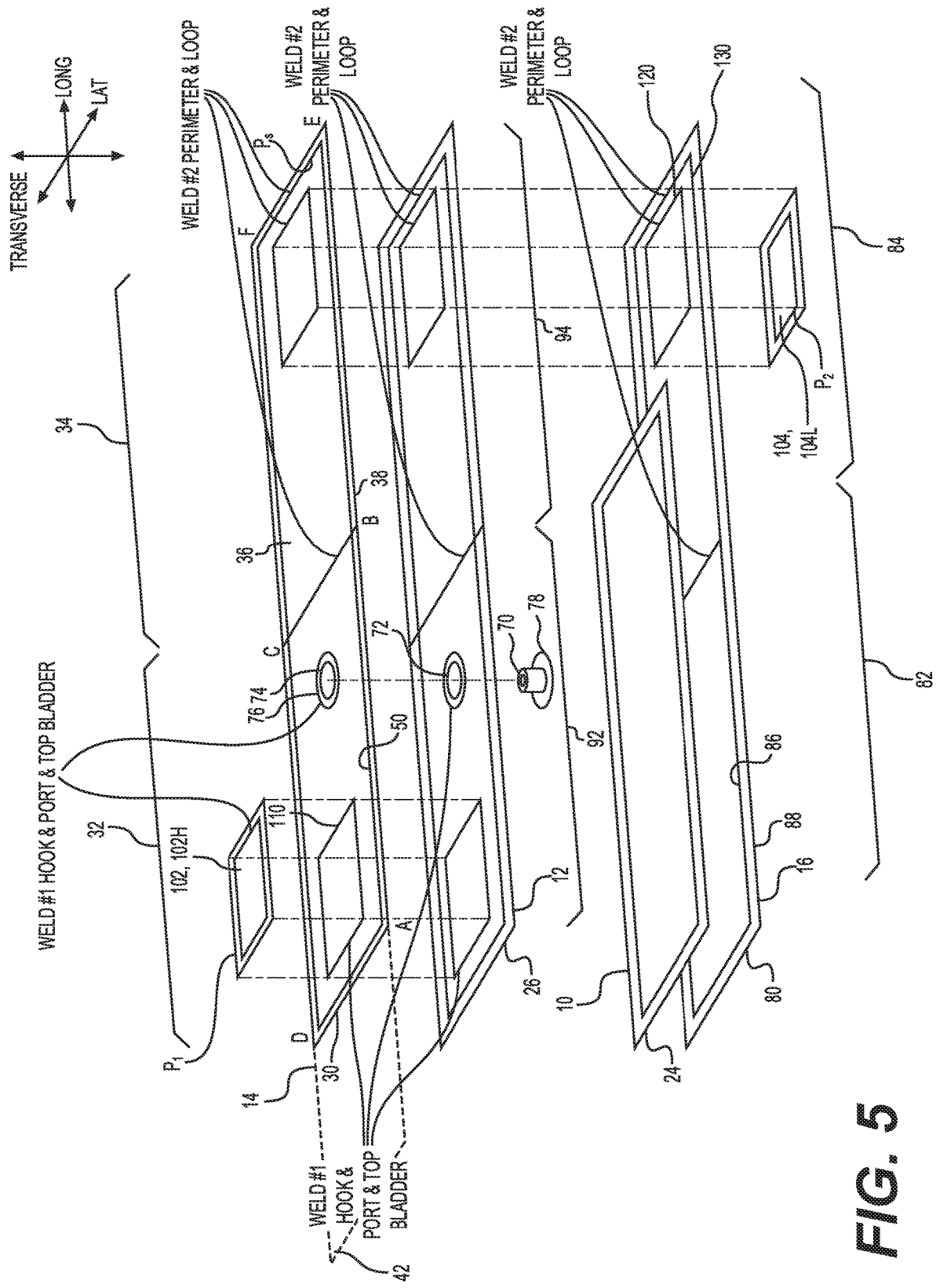
FIG. 5 is a schematic, exploded perspective view of another embodiment of the blood pressure cuff having a inner layer of a first material, an extended outer layer of a second material, a top sheet of a third material and a bottom sheet of a fourth material.
Figure 7:
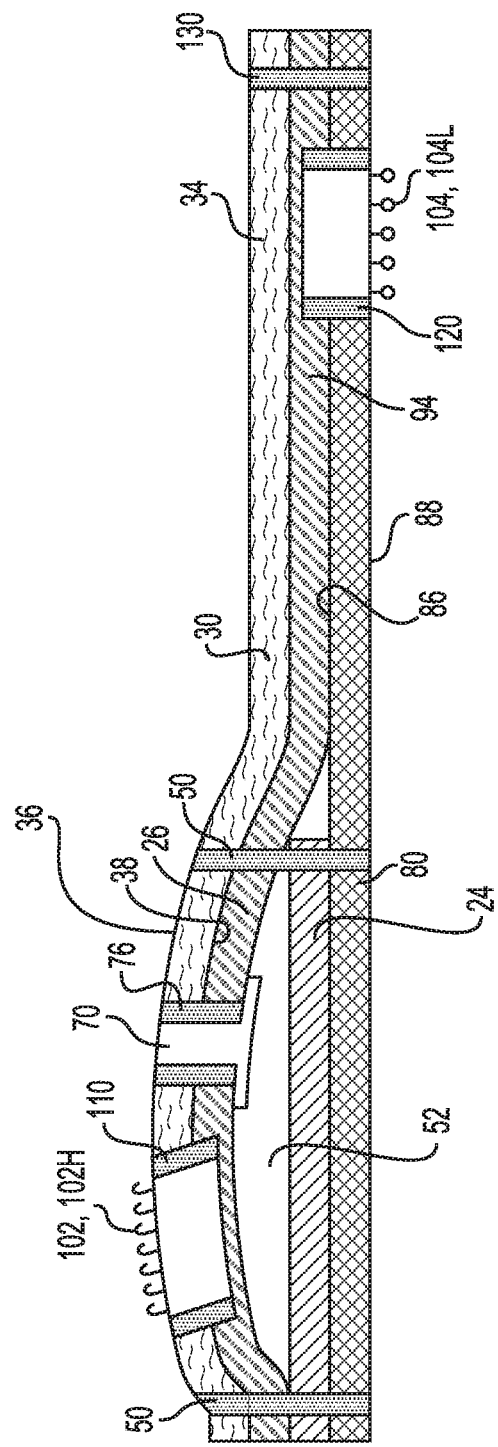
FIG. 7 is a nonexploded cross sectional side elevation view of the cuff of FIG. 5.

FIGS. 5-7 show a "premium" cuff that the above mentioned consumers may find more satisfactory. The premium cuff is similar to the low-cost cuff of FIGS. 1-3, but includes, among other things, a bottom sheet 80 having a top surface 86 and a bottom surface 88. The bottom sheet includes at least a first portion 82 which underlies inner layer 24. In the illustrated embodiment the bottom sheet also includes a bottom sheet tail portion 84 extending longitudinally from the first portion 82 of the bottom sheet 80. At least the first portion 82 of the bottom sheet 80 is made of a fourth material 16 which is not weldable to itself. The fourth material 16 may be the same material as the third material 14 that the top sheet 30 is made from.

Outer layer 26 of the cuff of FIGS. 5-7 includes both a first portion 92 and a longitudinal extension 94 which extends longitudinally from the first portion and resides transversely between top sheet 30 and bottom sheet 80, specifically between the tail portion 34, of top sheet 30 and tail portion 84 of bottom sheet 80.

In the embodiment of FIGS. 5-7 bladder weld joint 50 extends transversely into bottom sheet 80 thereby joining the bottom sheet 80 to at least the inner layer 24. In the illustrated embodiment the first material 10 from the inner layer 24 and the second material 12 from the outer layer 26 can melt into the top sheet 30 and bottom sheet 80 thereby joining together top sheet 30, outer layer 26, inner layer 24, and bottom sheet 80. The space defined by the inner layer 24 and the outer layer 26 within the boundary of the bladder weld joint is the pressurizable compartment 52. As with the low-cost embodiment of FIGS. 1-3, it should be understood that because FIG. 5 is an exploded view, feature 50 is, strictly speaking, a depiction of the location of the weld joint at the various laminations (layers and sheets) rather than the weld joint itself.

As seen best in FIG. 6 blood pressure cuff 20 can be configured to wrap around a patient limb A (e.g., a patient's arm, a patient's leg, etc.) with bottom sheet 80 in contact with the patient limb A. Inflation of the cuff during blood pressure measurement puts top sheet 30 in tension but does not appreciably tension bottom sheet 80. Accordingly, the tensile strength of the top sheet may exceed that of the bottom sheet. Additionally, the softness of bottom sheet 80, in comparison to that of inner layer 24, may result in the cuff being more comfortable for the patient. Further, the bottom sheet 80 may also be moisture absorbant so that it absorbs perspiration from the skin of the patient.

The cuff includes a closure assembly 100 adapted to hold the cuff in a sleeve configuration as seen in FIG. 6A. The closure assembly comprises a first closure element 102 exposed on a top surface 36 of the first portion 32 of the top sheet 30 and a second closure element 104 exposed on a bottom surface 88 of the bottom sheet tail portion 84. The first closure element 102 and the second closure element 104 can be configured to mate with each other in order to hold the cuff in the sleeve configuration in which the top sheet 30 is radially outboard of the inner layer 24 and the outer layer 26 at any cross section, such as 6B-6B and 6C-6C, that does not include circumferentially overlapping portions of the cuff. In the illustrated embodiment the first closure element 102 is a first member such as 102H of a hook and loop pair and the second closure element 104 is a second member such as 102L of the hook and loop pair.

The embodiment of FIGS. 5, 6A-6C, and 7 may be referred to as an "extended outer layer" embodiment because outer layer 26 may extend longitudinally (circumferentially) further than inner layer 24. The extended outer layer embodiment can include a first closure weld joint 110 extending through the first portion 32 of top sheet 30 and thereby uniting closure element 102, top sheet 30, and outer bladder layer 26 at the perimeter $P_1$ of the first closure element 102.

A second closure weld joint 120 extends through bottom sheet tail portion 84 and into outer layer extension 94 thereby uniting second closure element 120, bottom sheet 80, and outer layer extension 94 at the perimeter $P_2$ of the second closure element.

The cuff also includes an auxiliary weld joint 130. The auxiliary weld joint unites bottom sheet tail portion 84, outer layer extension 94, and top sheet tail portion 34 at a perimeter segment PS of the cuff extending from B to corner E to corner F to C. In other words, perimeter segment PS can be the perimeter of the cuff excluding the portion of the perimeter CDAB sealed by the bladder weld joint. The role of extension 94 is to provide material for the top sheet 30 and bottom sheet 80 to bond to, given that the third material 14 and the fourth material 16 do not bond to each other.

The cuff also includes a port 70 projecting through a bladder opening 72 in outer layer 26 and through a top sheet opening 74 in first portion 32 of top sheet 30. The port is welded to the inner layer at a port weld joint 76 that extends into the first portion of the top sheet.

Figure 8:
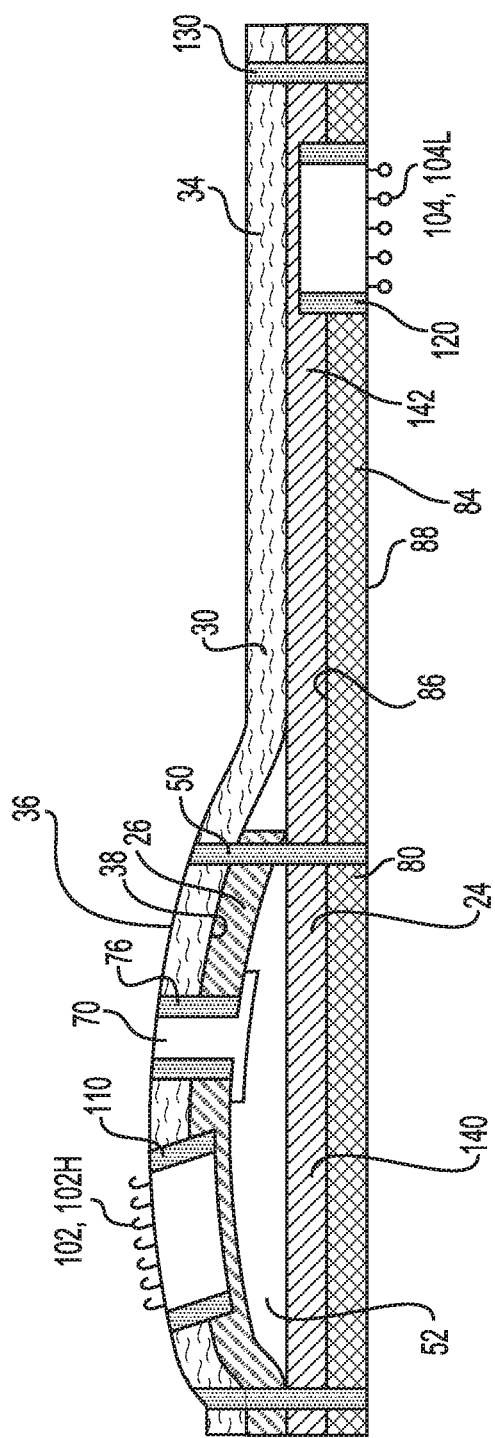
FIG. 8 is a schematic, cross sectional side elevation view of a cuff similar to that of FIG. 7 having an extended inner layer of a first material, an outer layer of a second material, a top sheet of a third material and a bottom sheet of a fourth material.

FIG. 8 shows an extended inner layer embodiment in which outer layer extension 94 (of FIG. 7) is absent, but inner layer 24 includes a first portion 140 and a longitudinal extension 142. The longitudinal extension 142 resides transversely between top sheet 30 and bottom sheet 80. As with the embodiment of FIG. 7, the extended inner layer embodiment of FIG. 8 includes a first closure weld joint 110 extending through first portion 32 of top sheet 30 thereby uniting first closure element 102, top sheet 30 and outer bladder layer 26 at the perimeter $P_1$ of the first closure element 102.

A second closure weld joint 120 extends through the bottom sheet tail portion 84 and into the inner layer extension 142 thereby uniting second closure element 104, bottom sheet 80, and inner layer extension 142, at the perimeter $P_2$ of the second closure element 104.

An auxiliary weld joint 130 unites bottom sheet tail portion 84, inner layer extension 142, and top sheet tail portion 34 at perimeter segment PS of the cuff. Weld joint 130 of FIG. 8 is analogous to weld joint 130 of FIG. 7 except that it involves inner layer 24 rather than outer layer 26.

Figure 9:
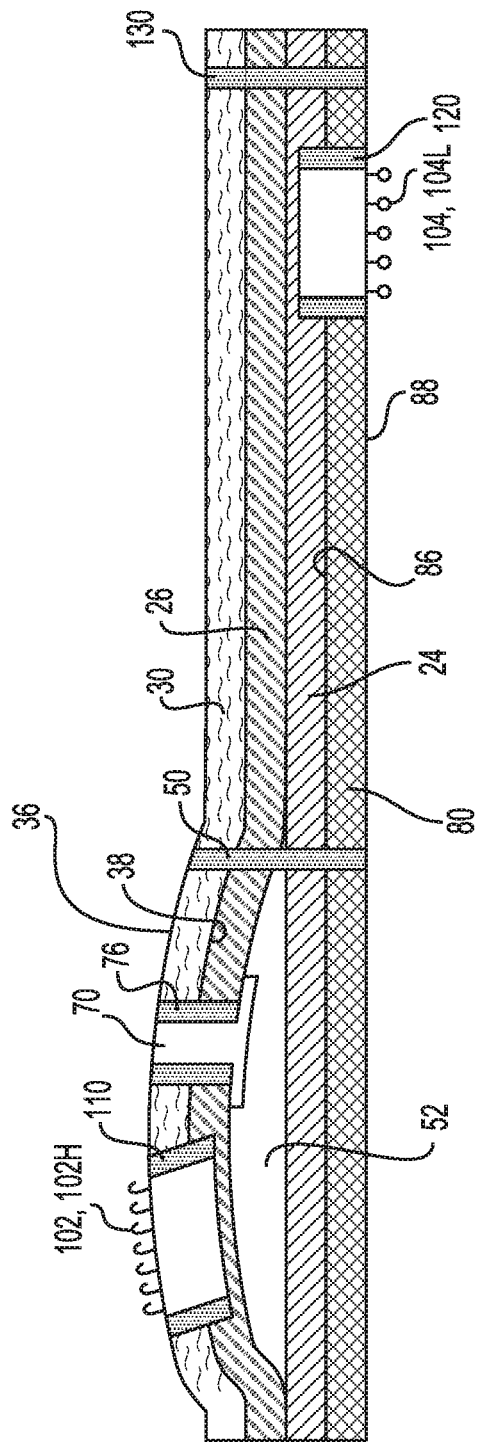
FIG. 9 is a schematic, cross sectional side elevation view of a cuff similar to that of FIG. 7 having an extended inner layer of a first material, an extended outer layer of a second material, a top sheet of a third material and a bottom sheet of a fourth material.

The cuff also includes a port 70 projecting through a bladder opening 72 in outer layer 26 and through top sheet opening 74 in first portion 32 of top sheet 30. The port is heat welded to the inner layer 24 at a port weld joint 76 that extends into the first portion 32 of the top sheet 30. In some embodiments, and during manufacture, a first closure weld joint 110 and port weld joint 76 can be formed in a first welding operation. In some additional embodiments, and during manufacture, a second closure weld joint 120, bladder weld joint 50, and auxiliary weld joint 130 can be formed in a second welding operation. For example, the first welding operation can be carried out before the second welding operation. In some additional examples, the second welding operation can be carried out before the first welding operation FIG. 9 shows a cuff embodiment having both an outer layer extension 94 and an inner layer extension 142. Extensions 94, 142 reside transversely between top sheet 30 and bottom sheet 80. A first closure weld joint 110 extends through first portion 32 of top sheet 30 thereby uniting first closure element 102, top sheet 30 and outer bladder layer 26 at the perimeter P₁ of the first closure element 102.

A second closure weld joint 120 extends through bottom sheet tail portion 84, and into inner layer extension 142 thereby uniting second closure element 104, bottom sheet 80, and inner layer extension 142 at the perimeter P₂ of the second closure element.

An auxiliary weld joint 130 unites bottom sheet tail portion 84, inner layer extension 142, outer layer extension 94, and top sheet tail portion 34 at the perimeter segment PS. Weld joint 130 of FIG. 9 is analogous to weld joints 130 of FIGS. 7 and 8 except that it involves both the inner layer 24 and the outer layer 26 rather than one or the other.

The cuff also includes a port 70 projecting through a bladder opening 72 in outer layer 26 and through top sheet opening 74 in first portion 32 of top sheet 30. The port can be heat welded to the inner layer 24 at a port weld joint 76 that extends into the first portion 32 of the top sheet 30. For example, and during manufacture, the first closure weld joint 110 and port weld joint 76 can formed in a first welding operation. Additionally, and during manufacture, the second closure weld joint 120, bladder weld joint 50, and auxiliary weld joint 130 can formed in a second welding operation. In some embodiments, the first welding operation is carried out before the second welding operation. In some additional embodiments, the second welding operation is carried out before the first welding operation.

In comparison to the low-cost embodiment of FIGS. 1-3, the enhanced embodiment of FIGS. 5-7, 8, and 9 provides a comfortable patient interface (bottom sheet 80) and a closure assembly (hook and loop 102, 104 which users seem to prefer more than tape 60) while retaining many of the low cost, environmentally friendly, and disposability features of the low-cost cuff.

Figure 10:
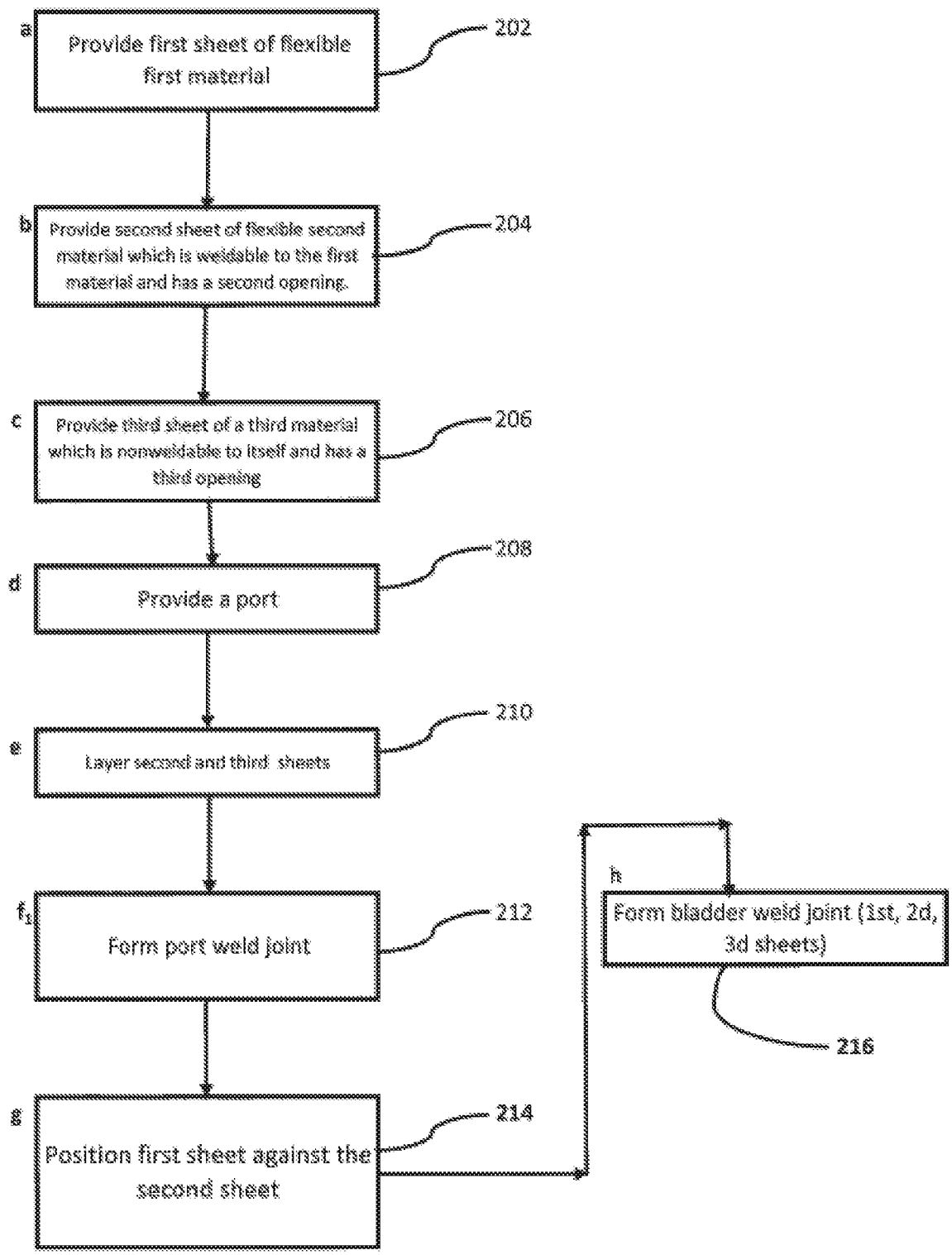
FIG. 10 is a block diagram of a method of manufacturing the low-cost cuff of FIGS. 1-3.

FIG. 10 is a block diagram disclosing a method of manufacturing the low-cost cuff of FIGS. 1-3. Referring to FIGS. 1-3 in addition to FIG. 10, the steps of the method are set forth below.

Block 202: Provide a first sheet 24 of a flexible first material.

Block 204: Provide a second sheet 26 of a flexible second material which is weldable to the first material and which has a second opening 72 extending therethrough. (Opening 72 is referred to as "second" because it extends through the second sheet; there is no "first" opening.) The second material may be the same material as the first material, i.e. having the same composition and structure.

Block 206: Provide a third sheet 30 of a third material that is nonweldable to itself and which has a first portion 32, a tail portion 34 extending longitudinally from the first portion 32, and a third opening 74 extending therethrough. Opening 74, is referred to as "third" because it extends through the third sheet 30.

Block 208: Provide a port 70.

Block 210: Layer the second sheet 26 and the third sheet 30 such that the second sheet 26 and a first portion 32 of third sheet 30 are longitudinally coextensive with each other and so that second opening 72 and third opening 74 register with each other as seen in at least FIGS. 1-2. Longitudinal coextensivity refers to longitudinal coextensivity of the sheets of the finished product as seen in FIGS. 1-2. Additional material which may be present during manufacturing, but which is not present in the finished product, is disregarded in evaluating longitudinal coextensivity. One example is sacrificial flap 42 of third sheet 30 which is trimmed off before the cuff is considered to be in its finished state.

Block 212: Form a port weld joint 76 thereby uniting the port 70 and the second sheet 26 so that the port 70 projects through the second opening 74 and the third opening 76. The port weld joint may extend transversely into the third sheet 30.

Block 214: Position the first sheet 24 so that it is against and longitudinally and laterally coextensive with the second sheet 26. In other words, the perimeter of the first sheet 24 is line-on-line with the perimeter of the second sheet 26. Longitudinal coextensivity and line-on-line refer to the finished product and do not account for excess material which may be present at this point in the manufacturing process, but is later removed.

Block 216: Form a bladder weld joint 50 which unites the first sheet 24, the second sheet 26, and the third sheet 30 along the perimeters of the first sheet 24 and the second sheet 26 and laterally across the third sheet, i.e. along AB, BC, CD, and DA of FIG. 1.

In the description of the manufacturing method of FIG. 10, "perimeter" refers to the perimeter of the finished product as represented in FIGS. 1-2.

Figure 11:
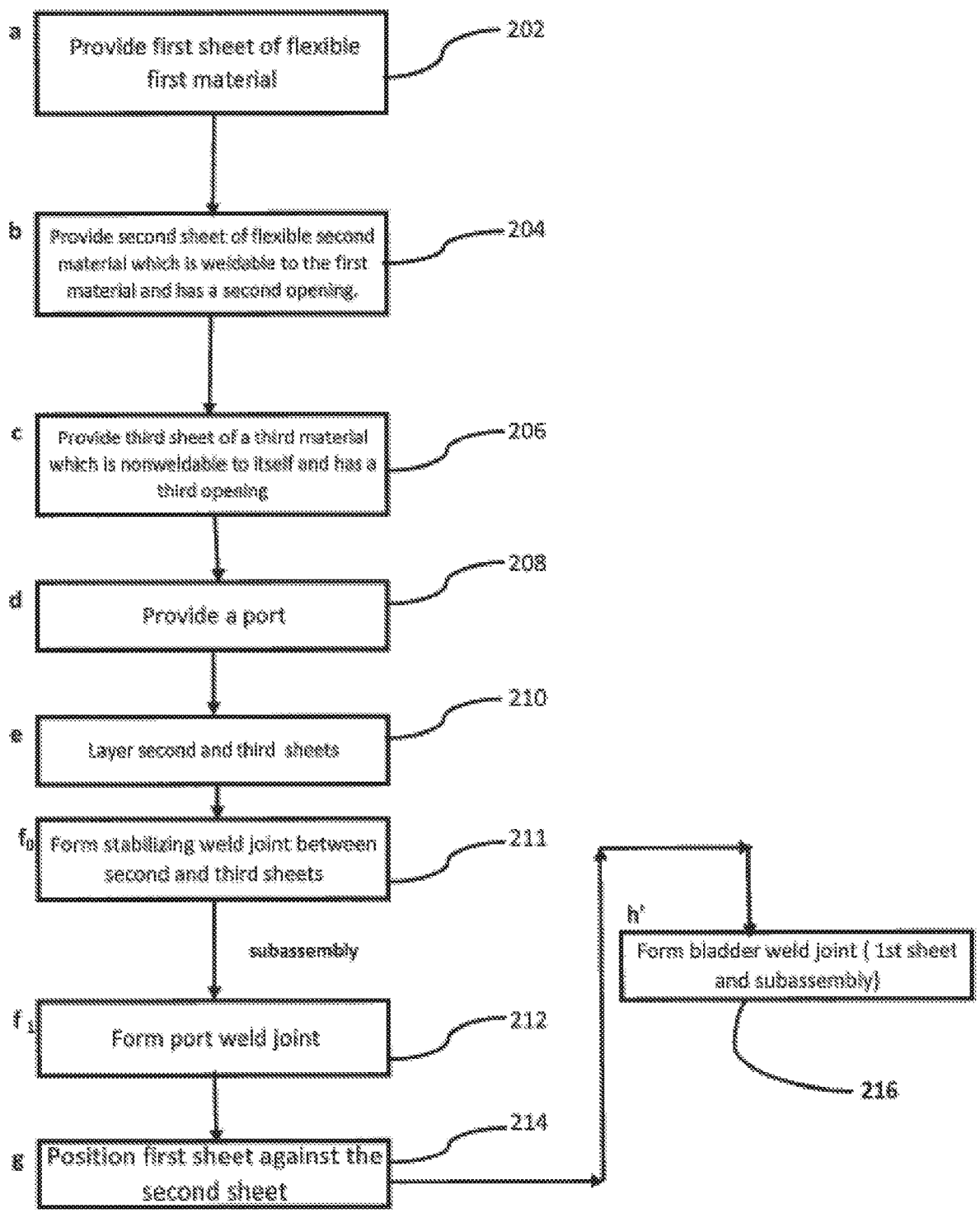
FIG. 11 is a block diagram similar to that of FIG. 10 showing an additional step of forming a stabilizing weld joint between second and third sheets of material.

As seen in FIG. 11, It may be desirable to include an additional step (block 211) of forming a weld joint between the second sheet 26 and the third sheet 30 after step 210 but before step 212 in order to hold the second sheet 26 and the third sheet 30 in their correct orientations relative to each other during formation of the port weld joint at step 212. The weld joint of block 211 may be referred to as a stabilizing weld joint which forms a subassembly of the second sheet 26 and the third sheet 30. The weld joint of block 211 may be continuous or discontinuous. Block 216 of FIG. 11 is a step of forming a bladder weld joint which unites the first sheet 24 with the subassembly along the perimeters of the first sheet 24 and the second sheet 26. It is analogous to block 216 of FIG. 10.

Figure 12:
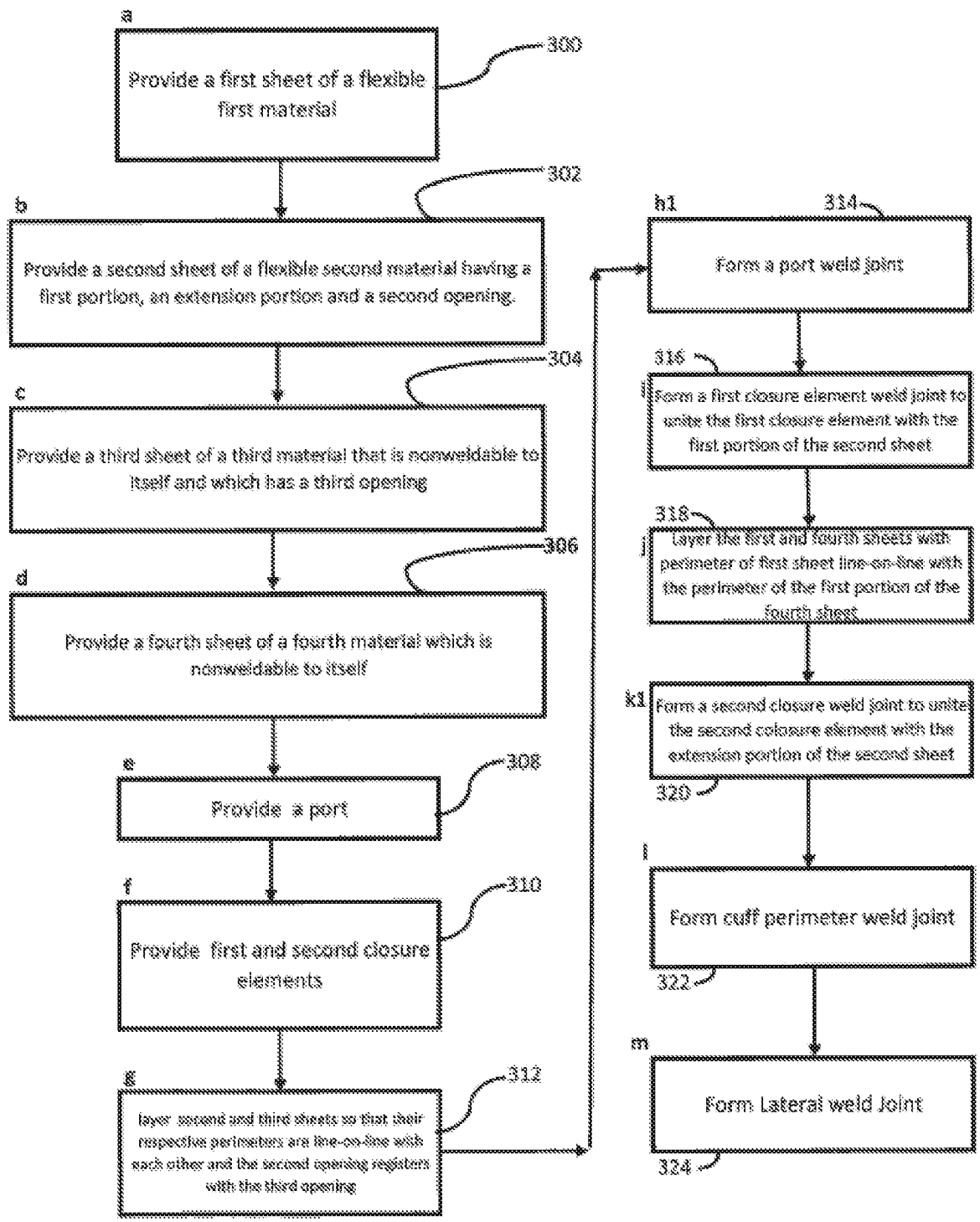
FIG. 12 is a block diagram of a method of manufacturing the cuff of FIG. 7.

FIG. 12 is a block diagram disclosing a method of manufacturing the premium cuff of FIGS. 5, 6 and 7. Referring to FIGS. 5, 6, and 7 in addition to FIG. 12, the steps of the method are set forth below.

Block 300: Provide a first sheet 24 of a flexible first material. In comparison to a second 26 sheet of material provided at block 302, the first sheet 24 of material is longitudinally shorter so that it corresponds to only the first portion 92 of the second sheet 26, not to the extension portion 94 of the second sheet 26.

Block 302: Provide a second sheet 26 of a flexible second material which is weldable to the first material and which includes a first portion 92 with a second opening 72 extending therethrough and an extension portion 94 extending longitudinally from the first portion 92. (Opening 72 is referred to as "second" because it extends through the second sheet; there is no "first" opening.)

Block 304: Provide a third sheet 30 of a third material that is nonweldable to itself and which has a first portion 32 with a third opening 74 extending therethrough and a tail portion 34 extending longitudinally from the first portion 32. Opening 74, is referred to as "third" because it extends through the third sheet 30.

Block 306: Provide a fourth sheet 80 of a fourth material which is nonweldable to itself and nonweldable to the third material and which has a first portion 82 and a tail portion 84 extending longitudinally from the first portion 82.

Block 308: Provide a port 70.

Block 310: Provide a first closure element 102 and a second closure element 104.

Block 312: Layer the second sheet 26 and the third sheet 30 so that their respective perimeters (perimeters AEFDA) are line-on-line with each other and the second opening 72 registers with the third opening 74.

Block 314: Form a port weld joint 76 thereby uniting the port 70 and the second layer 26 so that the port 70 projects through the second opening 72 and the third opening 74.

Block 316: Form a first closure element weld joint 110 along the perimeter of the first closure element 102. The first closure weld joint extends through the third sheet 30 and unites the first closure element 102 with the first portion 92 of the second sheet 26 so that the first closure element 102 is exposed on the top surface 36 of the third sheet 30.

Block 318: Layer the first sheet 24 and the fourth sheet 80 so that the perimeter of the first sheet 24 is line-on-line with the perimeter of the first portion 82 of the fourth sheet 80 (perimeter ABCDA), and the first sheet 24 is against the second sheet 26 (i.e the first sheet intervenes transversely between the second sheet and the fourth sheet).

Block 320: Form a second closure weld joint 120 which unites the second closure element 104 with the extension portion 94 of the second sheet 26 so that the second closure element 104 is exposed on the bottom surface 88 of the fourth sheet 80. The second closure element weld joint 120 extends through the fourth sheet 80 and into the second sheet 26 along the perimeter of the second closure element 104, and may also extend into the third sheet 30.

Block 322: Form a cuff perimeter weld joint that unites, along the perimeter of the cuff (perimeter AEFDA), the third sheet 30, the second sheet 26, and the fourth sheet 80 where the first sheet 24 is not present at the cuff perimeter, and unites the third sheet 30, the second sheet 26, and the fourth sheet 80 where the first sheet 24 is present at the cuff perimeter.

Block 324: Form a lateral weld joint that unites the third sheet 30, the second sheet 26, and the fourth sheet 80 laterally across the cuff (seam along BC). The lateral weld joint, in combination with portion CDAB of the cuff perimeter weld joint, is analogous to perimetric bladder weld joint 50 of the low-cost embodiment of FIGS. 1-3.

In the above description "perimeter" refers to the perimeter of the finished product as indicated in FIG. 5. In other words one would be carrying out the method even if one or more flaps of excess material were present at the time the welds were formed, and those flaps were later trimmed off to achieve the finished product as applied to the patient.

Formation of the weld joints at blocks 314 and 316 may be considered to be a first welding operation which produces a top subassembly. The weld steps diagrammed individually at blocks 314 and 316 may be carried out separately in either order, or may be carried out concurrently. Formation of the weld joints at blocks 320, 322 and 324 may be considered to be a second welding operation carried out subsequent to the first welding operation. The weld steps diagrammed individually at blocks 320, 322 and 324 may be carried out separately in any convenient order, or may be carried out concurrently.

In one method of manufacturing the cuff of FIG. 12, the flexible first material and the flexible second material are the same flexible material, and the third material and the fourth material are the same material.

Figure 13:
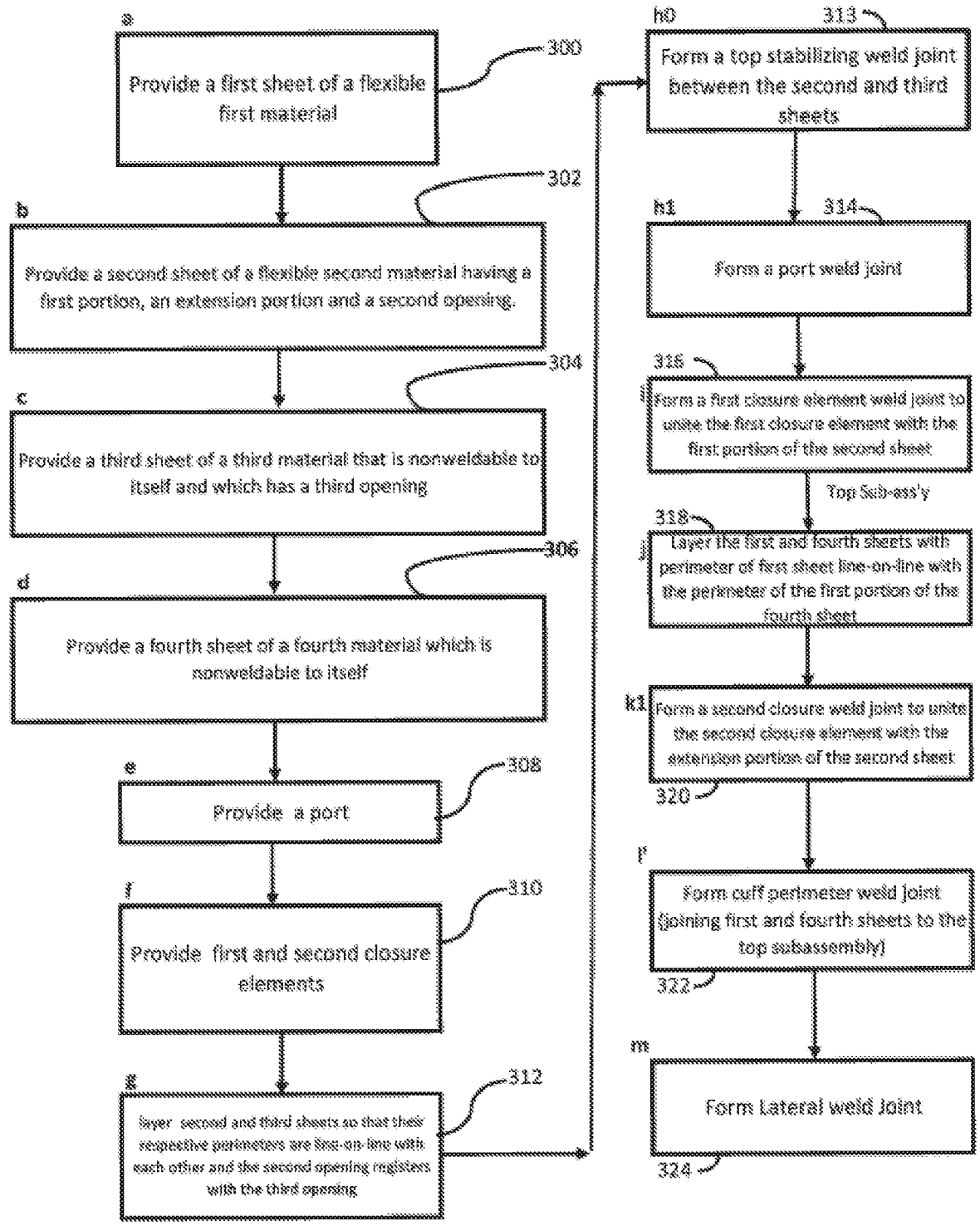
FIG. 13 is a block diagram similar to that of FIG. 12 showing an additional step of forming a top stabilizing weld joint between second and third sheets of material.

As seen in FIG. 13, It may be desirable to include an additional step (block 313) of forming a top stabilizing weld joint between the second sheet 26 and the third sheet 30 along perimeter AEFDA after step 312 but before steps 314 and 316 in order to hold the second sheet 26 and the third sheet 30 in their correct orientations relative to each other during formation of the port weld joint at step 314 and the first closure weld joint at step 316. The weld joint of block 313 may be continuous or discontinuous. Forming the weld joints of blocks 313, 314, 316 yields a top subassembly of the second sheet 26, third sheet 30, port 70, and first closure element 102. Block 322 of FIG. 13 is a step of forming a perimeter weld joint which unites the first sheet 24 and the fourth sheet 80 with the top subassembly along the perimeters of the top subassembly. It is analogous to block 322 of FIG. 12.

Figure 14:
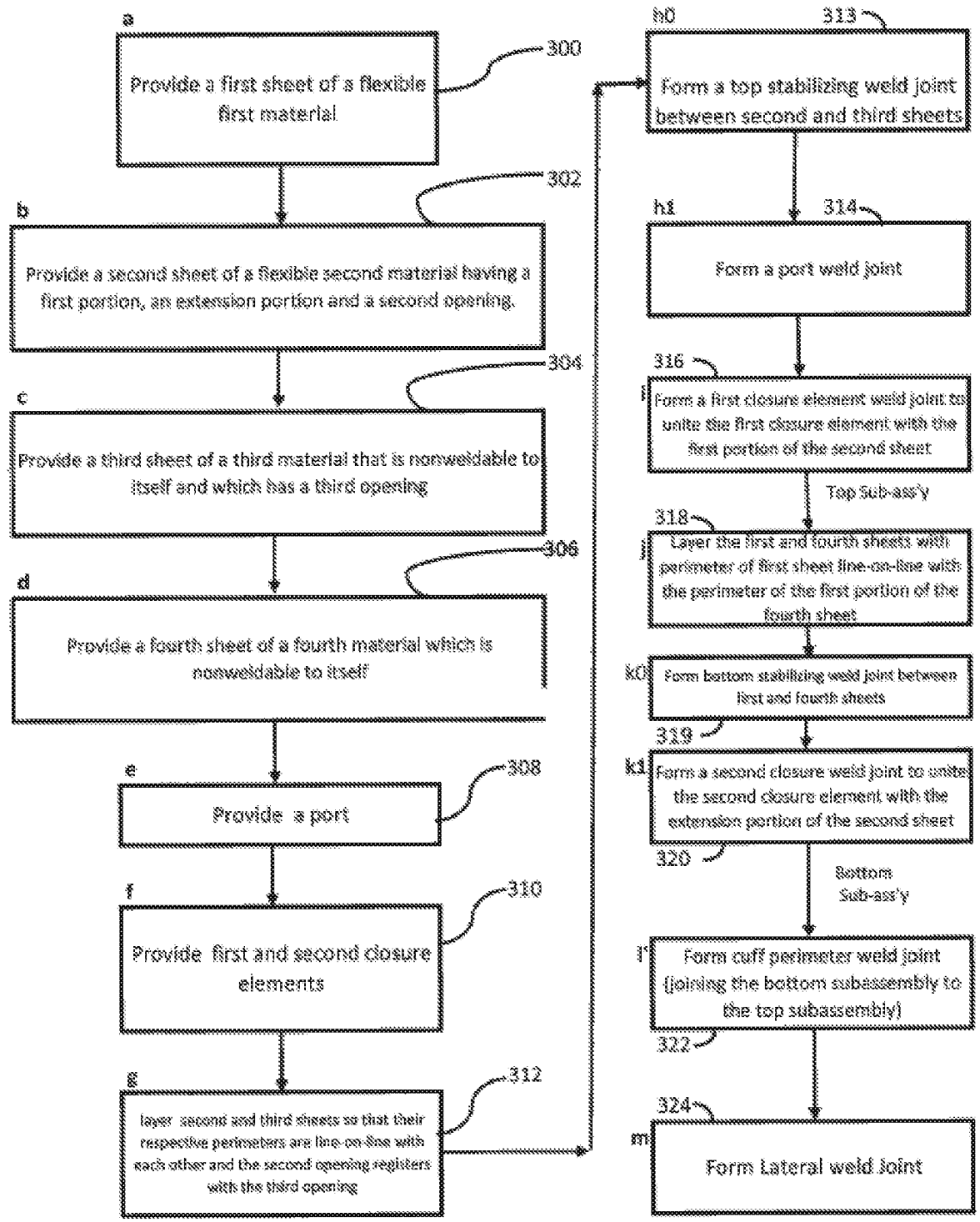
FIG. 14 is a block diagram similar to that of FIG. 13 showing an additional step of forming a bottom stabilizing weld joint between first and fourth sheets of material.

As seen in FIG. 14, It may be desirable to include an additional step (block 319) of forming a bottom stabilizing weld joint between the first sheet 24 and the fourth sheet 80 along perimeter ABCD of the first sheet 24 after step 318 but before step 320 in order to hold the first sheet 24 and the fourth sheet 80 in their correct orientations relative to each other during subsequent welds. The weld joint of block 319 may be continuous or discontinuous. Forming the weld joint of blocks 319 and 320 yields a bottom subassembly of the first sheet 24, fourth sheet 80, and second closure element 104. Block 322 of FIG. 14 is a step of forming a cuff perimeter weld joint which unites the bottom subassemmbly with the top subassembly. It is analogous to block 322 of FIG. 13.

Manufacture can proceed without using either the top or bottom stabilizing weld joints. In another option both are used. In yet another option only the top stabilizing weld joint is used. In still another option only the bottom stabilizing weld joint is used.

Figure 15:
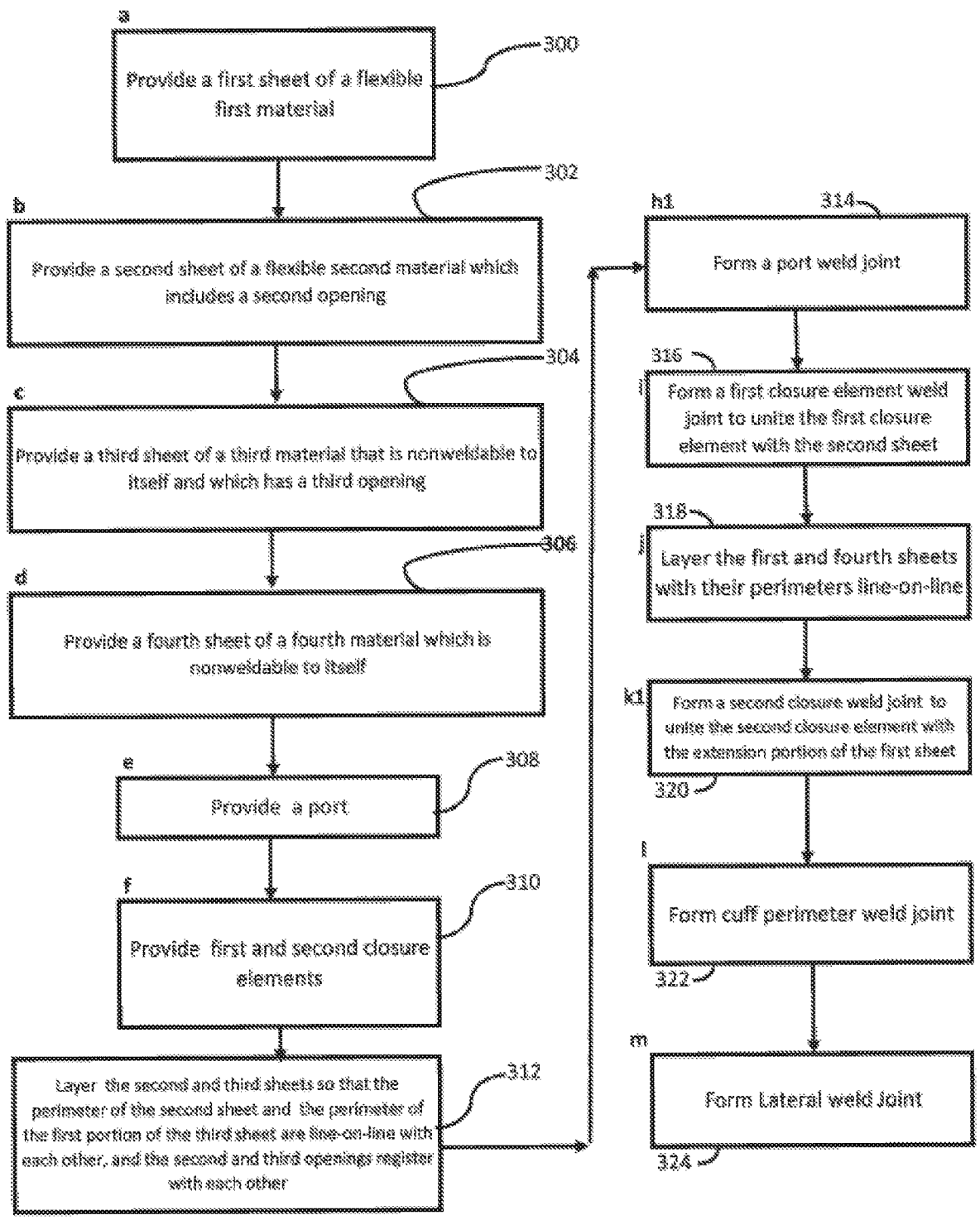
FIG. 15 is a block diagram of a method of manufacturing the cuff of FIG. 8.

FIG. 15 is a block diagram disclosing a method of manufacturing the premium cuff of FIG. 8. Referring to FIG. 8, in addition to FIG. 15, the steps of the method are set forth below.

Block 300: Provide a first sheet 24 of a flexible first material which includes a first portion 140 and an extension portion 142 extending longitudinally from the first portion 24.

Block 302: Provide a second sheet 26 of a flexible second material which is weldable to the first material and which has a second opening 72 extending therethrough. (Opening 72 is referred to as "second" because it extends through the second sheet; there is no "first" opening.) In comparison to the first sheet 24 of material provided at block 300, the second sheet 26 of material is longitudinally shorter so that it corresponds to only the first portion 140 of the first sheet 24, not to the extension portion 142 of the first sheet 24.

Block 304: Provide a third sheet 30 of a third material that is nonweldable to itself and which has a first portion 32 with a third opening 74 extending therethrough and a tail portion 34 extending longitudinally from the first portion. Opening 74, is referred to as "third" because it extends through the third sheet 30.

Block 306: Provide a fourth sheet 80 of a fourth material which is nonweldable to itself and nonweldable to the third material and which has a first portion 82 and a tail portion 84 extending longitudinally from the first portion.

Block 308: Provide a port 70.

Block 310: Provide a first closure element 102 and a second closure element 104.

Block 312: Layer the second sheet 26 and the third sheet 30 so that the perimeter of the second sheet 26 and the perimeter of the first portion 32 of the third sheet 30 are line-on-line with each other, and the second opening 72 and the third opening 74 register with each other.

Block 314: Form a port weld joint 76 thereby uniting the port 70 and the second layer 26 so that the port 70 projects through the second opening 72 and the third opening 74.

Block 316: Form a first closure element weld joint 110 along the perimeter of the first closure element 102. The first closure element weld joint 110 extends through the third sheet 30 and unites the first closure element 102 with the second sheet 26 so that the first closure element 102 is exposed on the top surface 36 of the third sheet 30.

Block 318: Layer the first sheet 24 and the fourth sheet 80 so that their respective perimeters (perimeters AEFDA) are line-on-line with each other.

Block 320: Form a second closure weld joint 120 which unites the second closure element 104 with the extension portion 142 of the first sheet 24 so that the second closure element 104 is exposed on the bottom surface 88 of the fourth sheet 80. The second closure element weld joint 120 extends through the fourth sheet 80 and into the first sheet 24 along the perimeter of the second closure element 104 and may also extend into the third sheet 30.

Block 322: Form a cuff perimeter weld joint that unites, along the perimeter of the cuff (perimeter AEFDA), the third sheet 30, the first sheet 24, and the fourth sheet 80 where the second sheet 26 is not present at the cuff perimeter, and unites the third sheet 30, the second sheet 26, the first sheet 24, and the fourth sheet 80, where the second sheet 80 is present at the cuff perimeter.

Block 324: Form a lateral weld joint that unites the third sheet 30, the second sheet 26, the first sheet 24, and the fourth sheet 80 laterally across the cuff (seam along BC). The lateral weld joint, in combination with portion CDAB of the cuff perimeter weld joint, is analogous to perimetric bladder weld joint 50 of the low-cost embodiment of FIGS. 1-3.

In the above description "perimeter" refers to the perimeter of the finished product as indicated in FIG. 5. In other words one would be carrying out the method even if one or more flaps of excess material were present at the time the welds were formed, and those flaps were later trimmed off to achieve the finished product as applied to the patient.

Formation of the weld joints at blocks 314 and 316 may be considered to be a first welding operation which produces a top subassembly. The weld steps diagrammed individually at blocks 314 and 316 may be carried out separately in either order, or may be carried out concurrently. Formation of the weld joints at blocks 320, 322 and 324 may be considered to be a second welding operation carried out subsequent to the first welding operation. The weld steps diagrammed individually at blocks 320, 322 and 324 may be carried out separately in any convenient order, or may be carried out concurrently.

In one method of manufacturing the cuff of FIG. 12, the flexible first material and the flexible second material are the same flexible material, and the third material and the fourth material are the same material.

A step or steps analogous to blocks 313 and/or 319 of FIG. 14 may be included in the method of FIG. 15 if desired.

Figure 16:
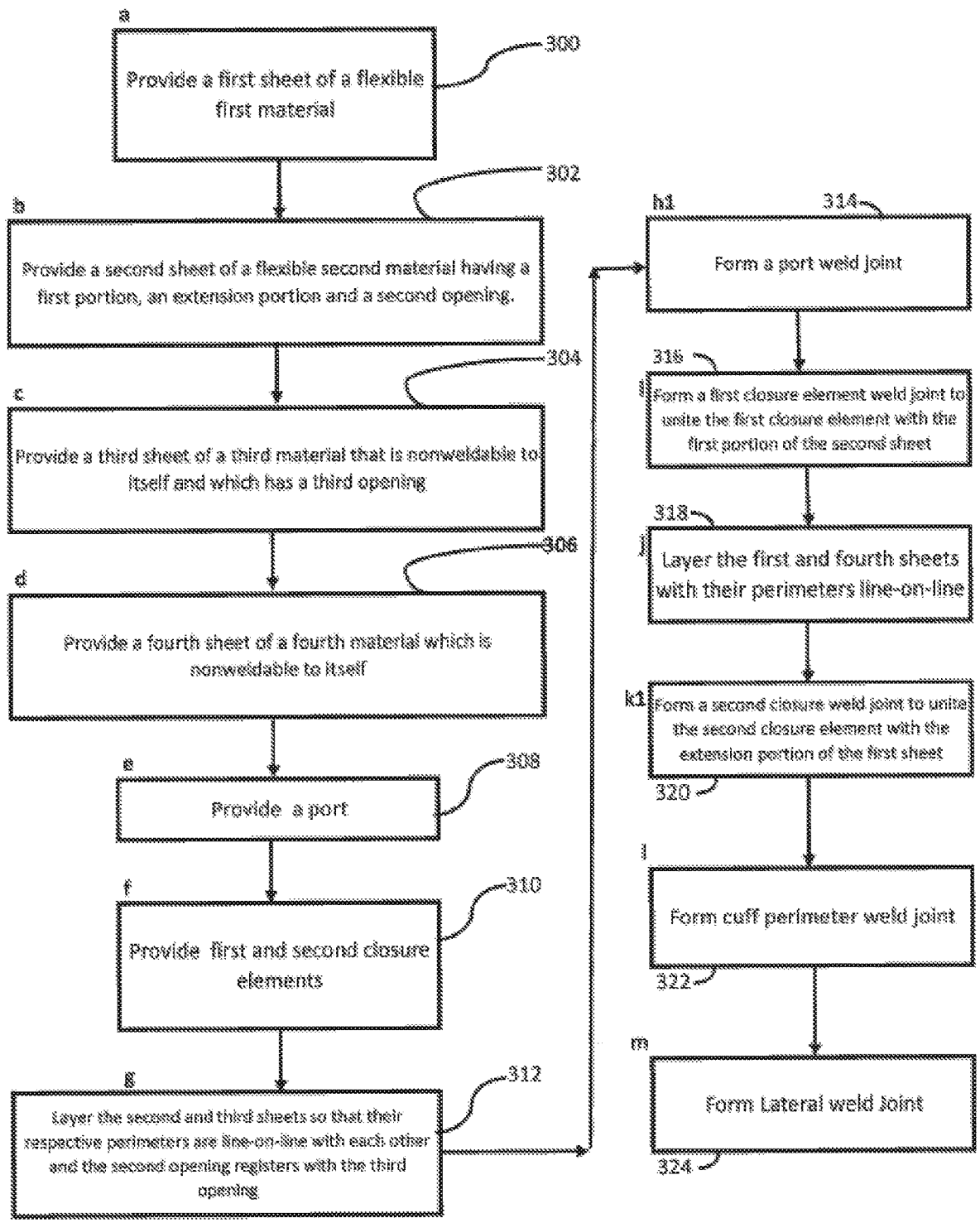
FIG. 16 is a block diagram of a method of manufacturing the cuff of FIG. 9.

FIG. 16 is a block diagram disclosing a method of manufacturing the premium cuff of FIG. 9. Referring to FIG. 9, in addition to FIG. 16, the steps of the method are set forth below.

Block 300: Provide a first sheet 24 of a flexible first material which includes a first portion 140 and an extension portion 142 extending longitudinally from the first portion 140.

Block 302: Provide a second sheet of a flexible second material which is weldable to the first material and which includes a first portion 92 with a second opening 72 extending therethrough and an extension portion 94 extending longitudinally from the first portion 92. (Opening 72 is referred to as "second" because it extends through the second sheet; there is no "first" opening.)

Block 304: Provide a third sheet 30 of a third material that is nonweldable to itself and which has a first portion 32 with a third opening 74 extending therethrough and a tail portion 34 extending longitudinally from the first portion 32. Opening 74 is referred to as "third" because it extends through the third sheet 30.

Block 306: Provide a fourth sheet 80 of a fourth material which is nonweldable to itself and nonweldable to the third material and which has a first portion 82 and a tail portion 84 extending longitudinally from the first portion.

Block 308: Provide a port 70.

Block 310: Provide a first closure element 102 and a second closure element 104.

Block 312: Layer the second sheet 26 and the third sheet 30 so that their respective perimeters (perimeters AEFDA) are line-on-line with each other and the second opening 72 registers with the third opening 74.

Block 314: Form a port weld joint 76 thereby uniting the port 70 and the second sheet 26 so that the port 70 projects through the second opening 72 and the third opening 74.

Block 316: Form a first closure element weld joint 110 which extends through the third sheet 30 and into the second sheet 26 along the perimeter of the first closure element 102. The first closure weld joint 110 unites the first closure element 102 with the first portion 92 of the second sheet 26 so that the first closure element 102 is exposed on top surface 36 of the third sheet 30.

Block 318: Layer the first sheet 24 and the fourth sheet 80 so that so that their respective perimeters (perimeters AEFDA) are line-on-line with each other.

Block 320: Form a second closure weld joint 120 which unites the second closure element 104 with the extension portion 142 of the first sheet 24 so that the second closure element 104 is exposed on the bottom surface 88 of the fourth sheet 80. The second closure element weld joint 120 extends through the fourth sheet 80 and into the first sheet 24 along the perimeter of the second closure element 104, and may also extend into the second sheet 26 and the third sheet 30.

Block 322: Form a cuff perimeter weld joint that unites, along the perimeter of the cuff (perimeter AEFDA), the third sheet 30, the second sheet 26, the first sheet 24, and the fourth sheet 80.

Block 324: Form a lateral weld joint that unites the third sheet 30, the second sheet 26, the first sheet 24, and the fourth sheet 80 laterally across the cuff (seam along BC). The lateral weld joint, in combination with portion CDAB of the cuff perimeter weld joint, is analogous to perimetric bladder weld joint 50 of the low-cost embodiment of FIGS. 1-3.

In the above description "perimeter" refers to the perimeter of the finished product as indicated in FIG. 5. In other words one would be carrying out the method even if one or more flaps of excess material were present at the time the welds were formed, and those flaps were later trimmed off to achieve the finished product as applied to the patient.

Formation of the weld joints at blocks 314 and 316 may be considered to be a first welding operation which produces a top subassembly. The weld steps diagrammed individually at blocks 314 and 316 may be carried out separately in either order, or may be carried out concurrently. Formation of the weld joints at blocks 320, 322 and 324 may be considered to be a second welding operation carried out subsequent to the first welding operation. The weld steps diagrammed individually at blocks 320, 322 and 324 may be carried out separately in any convenient order, or may be carried out concurrently.

In one method of manufacturing the cuff of FIG. 14, the flexible first material and the flexible second material are the same flexible material, and the third material and the fourth material are the same material.

A step or steps analogous to blocks 313 and/or 319 of FIG. 14 may be included in the method of FIG. 16 if desired.

Figure 17:
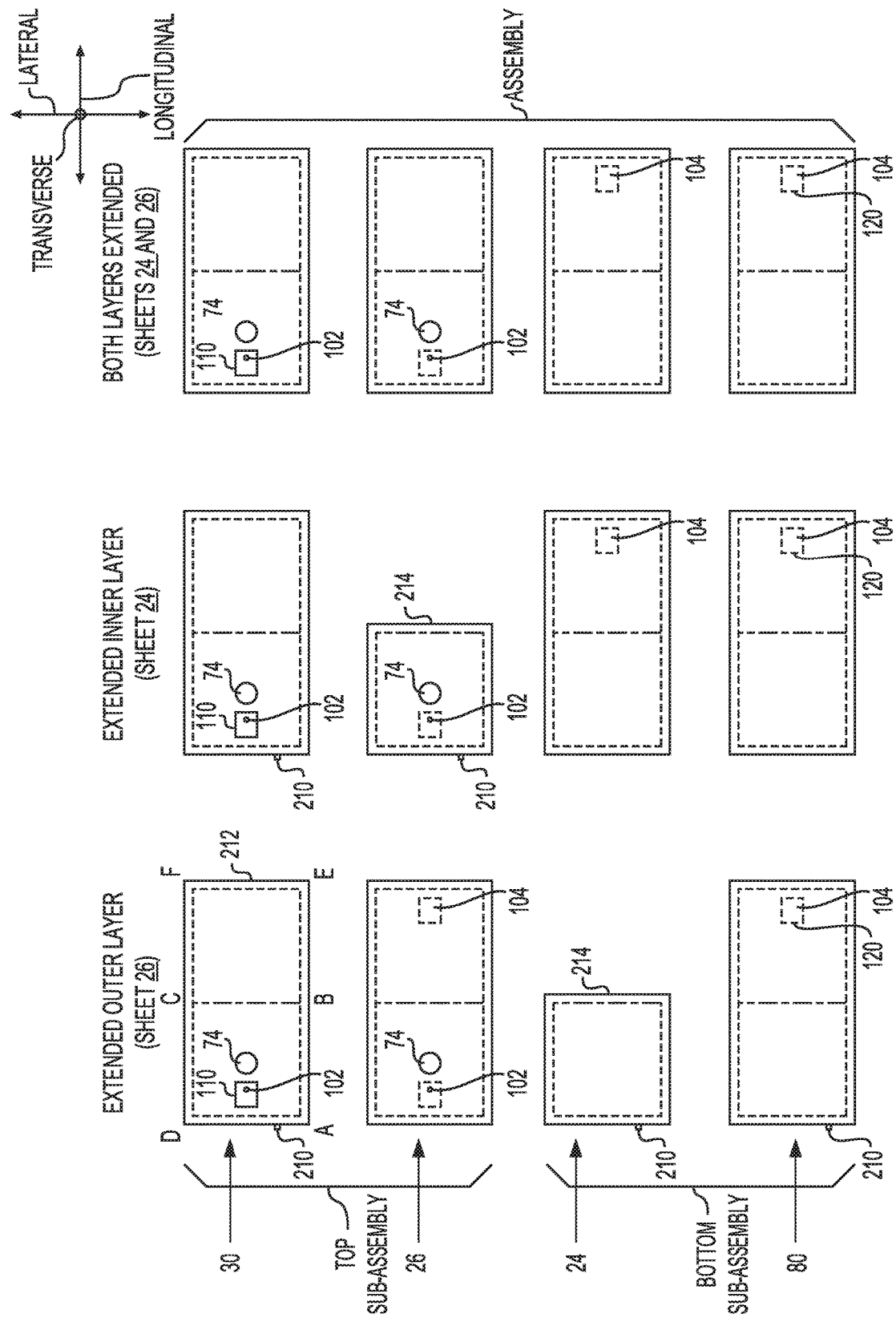
FIG. 17 is schematic top plan views of first and second sheets of a flexible bladder material, a third sheet of a top cover material and a fourth sheet of a bottom cover material of a blood pressure cuff presented in connection with a generic manufacturing method.
Figure 18:
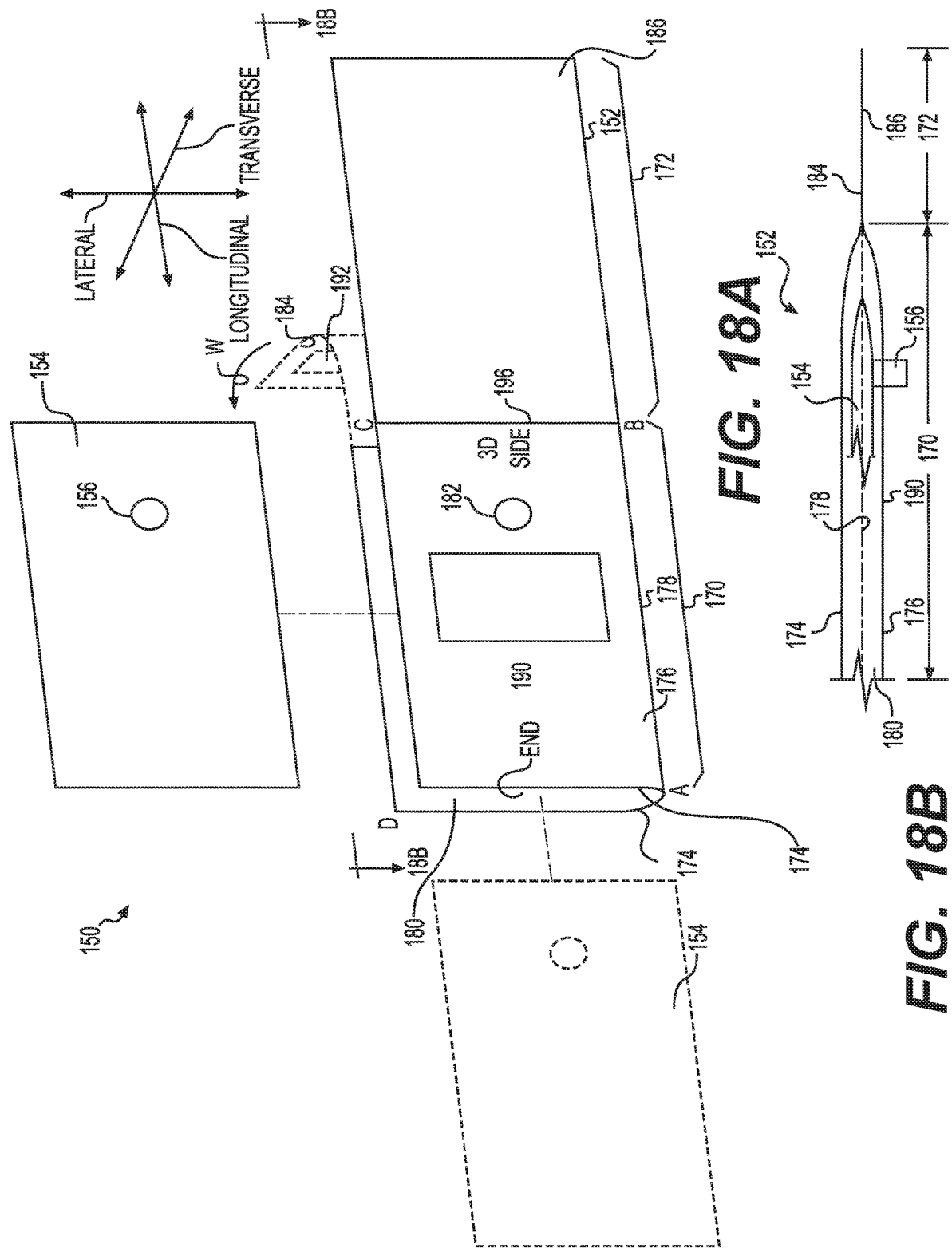
FIG. 18A is a schematic, perspective view of an embodiment of a single use disposable jacket for a multiple use blood pressure measurement bladder, the jacket including an edge opening and an end opening.
FIG. 18B is a view in the direction 18B-18B of FIG. 18A.

The foregoing individually describes the manufacture of a blood pressure cuff having an extended inner layer or first sheet 24 (FIGS. 5-7), an extended outer layer or second sheet (FIG. 8) and an extended inner and outer layers or first sheet 24 and second sheet 26 (FIG. 9). Referring to FIG. 17, the manufacturing process can be stated more generically.

FIG. 17 shows top plan views of first sheet 24 and second sheet 26 of a flexible bladder material, a third sheet 30 of a top cover material and a fourth sheet 80 of a bottom cover material. The top sheet 30 can span longitudinally from a first longitudinal extremity 210 to a second longitudinal extremity 212. Corners labelled A, E, F, D define the perimeter (AEFDA) of the cuff. Label B is at a part span location between A and E; label C is at the part span location between D and F.

The first sheet 24 and the third sheet 30 can be weldable to each other. The third sheet 30 and the fourth sheet 80 may not be weldable to each other, but can be welded to the first sheet 24 and/or the second sheet 26. The leftmost column shows the sheets corresponding to a cuff with an extended outer layer or the first sheet 24. The middle column shows the sheets corresponding to a cuff with an extended inner layer or the second sheet 26. The rightmost column shows the sheets corresponding to a cuff with an extended inner layer or the first sheet 24 and an extended outer layer or the second sheet 26.

The third sheet 30 and the fourth sheet 80 can be congruent. "Congruent" is used herein in the conventional geometrical sense of being of the same size and shape. At least the first sheet or the second sheet (but not both) can also be congruent, i.e. has (or have) the same size and shape as the third sheet 30 and the fourth sheet 80. In the left column of FIG. 17, the second sheet 26 can be congruent. In the middle column first sheet 24 can be congruent. In the right column both the first sheet 24 and the second sheet 26 can be congruent.

Irrespective of which of the first sheet 24 and the second sheet 26 are congruent in individual examples, the manufacturing method can form a top subassembly of the second sheet 26 and the third sheet 30, can form a bottom subassembly of the first sheet 24 and the fourth sheet 80, and can form an assembly of the first subassembly and the second subassembly. In the assembly, the first sheet 24, the second sheet 26, the third sheet 30, and the fourth sheet 80 can be sealed together along the cuff perimeter (dashed line AEFDA). A part span seal extends laterally between B and C (dash-dot line). Pressurizable compartment 52 (FIGS. 7, 8, 9) can transversely positioned between the first sheet 24 and the second sheet 26 and can be bounded by the seals along BC and CDAB.

In the top subassembly, the congruent sheets (26 and 30 of the left and right columns) can be stacked in registration with each other. The phrase "in registration with each other", as applied to congruent sheets, means that there is complete overlap between the two sheets—corners A, E, F, D of one sheet correspond respectively to corners A, E, F, D of the other sheet and the perimeter segments AE, EF, FD, and DA are line-on-line with each other. The noncongruent sheet, if any, (middle column) is stacked so that one of its laterally extending longitudinal extremities 210 is a first extremity 210 which is line-on-line with extremity 210 of sheet 30 (i.e. perimeter segment DA. The other longitudinal extremity 214 of the noncongruent sheet, referred to as its interior longitudinal extremity, is at the location of the part-span seal (BC).

In the bottom subassembly, the congruent sheets (24 and 80 of the middle and right columns) are stacked in registration with each other. The noncongruent sheet, if any, (left column) is stacked so that one of its laterally extending longitudinal extremities 210 is a first extremity 210 which is line-on-line with extremity 210 of sheet 80 (i.e. perimeter segment DA. Its interior longitudinal extremity 214 is at the location of the part-span seal (BC).

In at least one embodiment, the top subassembly can include a first or top closure element 102 exposed on a top surface 36 of the third sheet 30 and/or the bottom subassembly includes a second or bottom closure element 104 exposed on a bottom surface 88 of the fourth sheet 80. Top closure element 102 is illustrated with a solid line on sheet 30 because the illustration is a top plan view and closure element 102 is exposed on the top surface 36 of the third sheet 30. Because the weld joint 110 for the top closure element penetrates transversely through the top sheet 30 and into at least second sheet 26, the planform of the top closure element is shown on sheet 26 with a dotted line. As previously noted, but not depicted in FIG. 17, weld joint 110 may extend transversely into the first sheet 24 and the fourth sheet 80.

Bottom closure element 104 is illustrated with a dashed line on sheet 80 because the illustration is a top plan view and closure element 104 is exposed on the bottom surface of sheet 80. Because the weld joint 120 for the bottom closure element penetrates transversely through bottom sheet 80 and into at least first sheet 24 (middle and right columns) the planform of the bottom closure element 104 is shown on the first sheet 24 with dotted lines. Similarly, in the left column weld joint 120 may penetrate into the second sheet 26, and therefore is depicted with dotted lines on the second sheet 26 of the left column. As previously noted, but not depicted in FIG. 17, weld joint 120 may extend transversely into the second sheet 26 and the third sheet 30 of the rightmost column and into the third sheet 30 of the leftmost column.

The top subassembly may also include a port 70 extending transversely through the second sheet 26 and the third sheet 30 at a location longitudinally between the first longitudinal extremity 210 and the longitudinal location the part span seal BC of the assembly.

In the above description of the generic manufacturing method "perimeter" and "congruent" refer to the finished product. In other words, one would be carrying out the method even if one or more flaps of excess material were present at the time the welds were formed, and those flaps were later trimmed off to achieve the finished product as applied to the patient.

FIGS. 18-21 show a blood pressure measurement component suite 150 comprised of a single use jacket 152 and a reusable pressurizable bladder 154 having an inflation and deflation port 156. In one embodiment the bladder is made of polyethylene. In another embodiment the bladder is made of polypropylene. In another embodiment the bladder is made of polyethylene and polypropylene. The bladder and jacket are not integral with each other. In other words the bladder and jacket are separate components. Nevertheless the bladder and jacket are adapted to work cooperatively with each other.

The jacket has a bladder portion 170 and a tail portion 172 extending longitudinally from the bladder portion. The bladder portion has an inner panel 174 and an outer panel 176 which meet at a panel juncture 178 to define bladder pocket 180 having a port opening 182 therein. Juncture 178 is illustrated as a fold in a single piece of material. In one alternative arrangement juncture 178 may be a seam joining together two pieces of material, an inner piece corresponding to inner panel 174 and an outer piece corresponding to outer panel 176. Tail portion 152 has an inner surface 184 and an outer surface 186.

Pocket 180 is adapted to receive the bladder, and the bladder is adapted to fit in the pocket. A jacket closure element 190 which may be a single element or part of a multiple element closure assembly, is provided to maintain the jacket in a sleeve configuration. In one example the illustrated closure element is a first closure element 190 on the outer panel of the first portion of the jacket, and the jacket includes a second closure element 192 on the inner surface of the tail.

Bladder portion 170 includes second and fourth sides AB, CD, which extend longitudinally between first and third end sides AD, BC. The second and fourth sides may also be referred to as edge sides. The first and third sides may also be referred to as end sides. The first and third sides AD BC, extend laterally between the second and fourth sides AB, CD. Tail portion 172 extends longitudinally from a juncture 196 corresponding to third side BC of the bladder portion. Port opening 182 is longitudinally between closure element 190 and third side BC.

At least one of the first, second, third and fourth sides is a closed side, and at least one of the first, second, third and fourth sides is an open side. As a practical matter no more than two sides are open sides. For example as seen in FIG. 17A second side AB is a closed side due to juncture (e.g. fold or seam) 178, and third side BC is a closed side due to juncture 196. There are no seams or other joinder elements along first and fourth sides AD, CD. Those sides are therefore open sides along which the inner and outer panels can be transversely separated from each other to access the pocket. The open sides define a single pocket opening CDA, or can be thought of as defining a longitudinally extending pocket edge opening CD and a laterally extending pocket end opening AD which meet at corner D.

In one embodiment jacket 152 is made of approximately 40% to 70% paper pulp with the balance being polyethylene and/or polyester fibers 40 (FIGS. 3-4). In another embodiment jacket is made of approximately of 50% to 60% paper pulp with the balance being polyethylene and/or polyester fibers. One example of a suitable material is a creped spun lace material. One specific example of a creped spun lace material is Pro Towel, in particular Pro Towel 93141.

In practice a user places bladder 154 into pocket 180 by way of opening CDA (alternatively, openings CD and AD) so that bladder port 156 projects through port opening 182. The user wraps the jacket/bladder assembly around the patient's arm in direction W, and secures it in place with the closure element 190 or closure elements 190, 192. If tubing is not already permanently connected to port 156 the user connects tubing to the port. The user may then proceed to take a blood pressure measurement. When finished, the user can discard the low-cost jacket and retain the more expensive bladder for use with a new jacket.

The illustrated jacket is not securely closable. That is, although the inner and outer panels 174, 176 can be pinched together along open sides AD and CD, there is no securement element to secure the panels to each other along AD and CD. In an alternative embodiment a securement element can be provided if desired. The securement element can take any suitable form such as a zipper or a hook and loop arrangement that can be secured to trap the bladder in the pocket during use, and desecured to enable a user to place the bladder into the pocket in preparation for use or remove it from the pocket after use.

Figure 19:
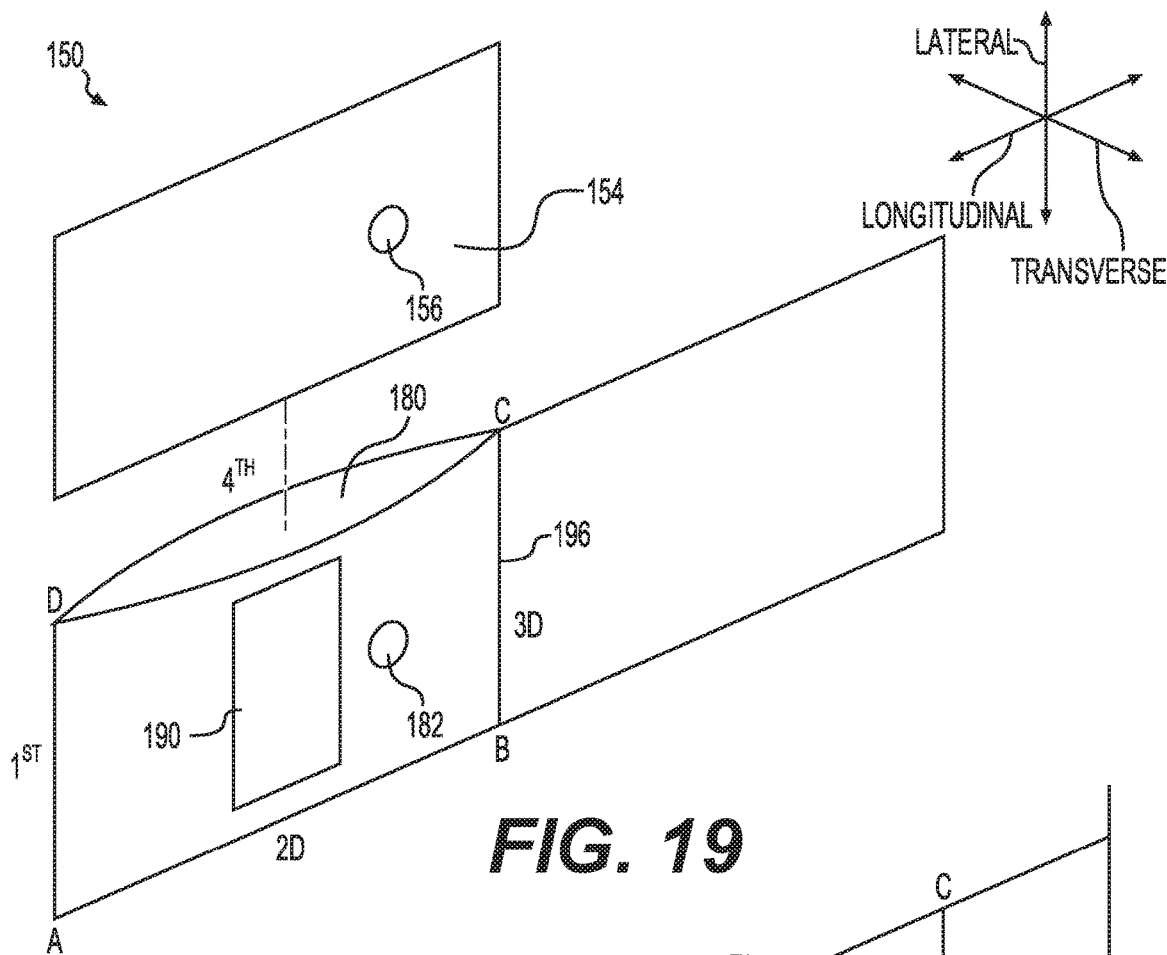
FIG. 19 is a schematic, perspective view of a jacket similar to that of FIGS. 18A and 18B having only an edge opening.

FIG. 19 shows a specific embodiment in which only the only open side of the bladder is the fourth side CD.

Figure 20:
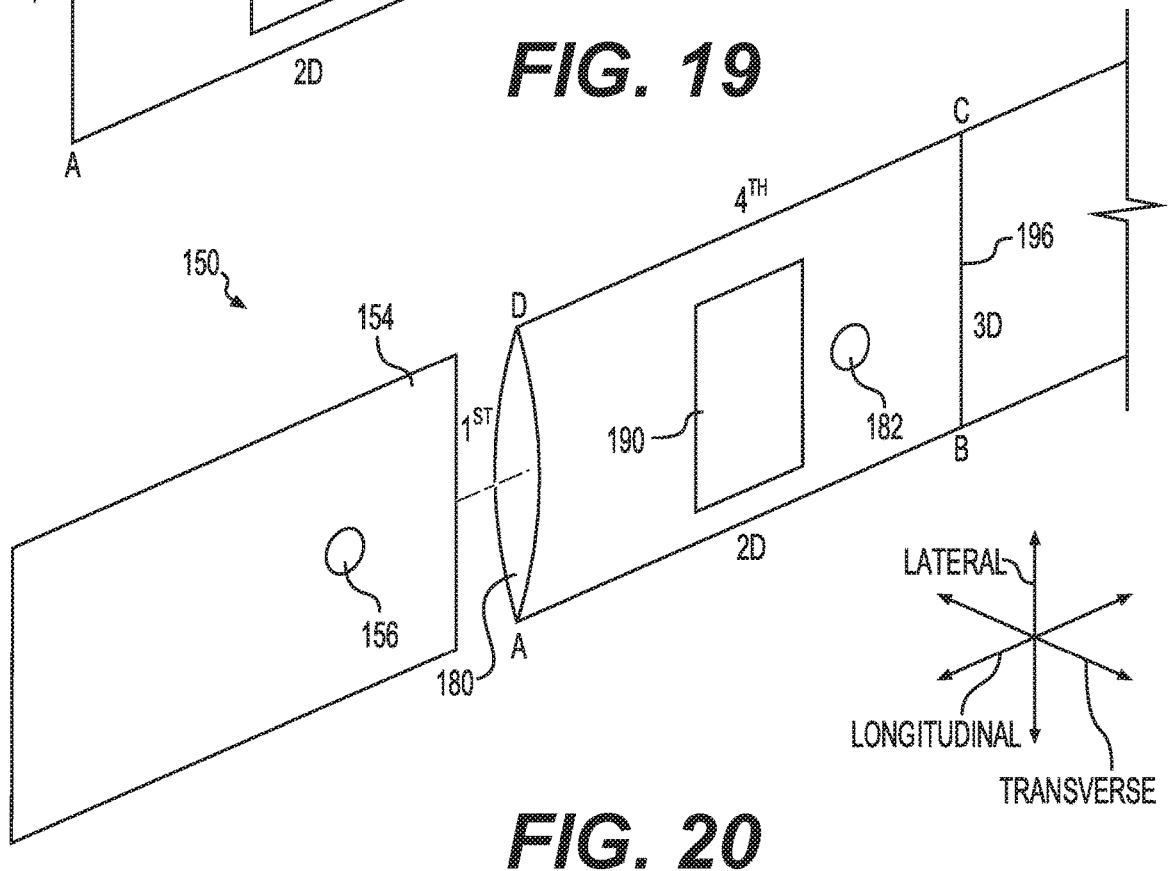
FIG. 20 is a schematic, perspective view of a jacket similar to that of FIG. 19 having only an end opening remote from a tail portion of the jacket.

FIG. 20 shows a specific embodiment in which only the only open side of the bladder is the first side AD.

FIG. 21 shows a specific embodiment in which only the only open side of the bladder is the third side BC.

Because the jacket of FIGS. 18-21 is made of a low cost, clean burning material it can be discarded after a single use thereby reducing the risk of patient to patient contamination without incurring excessive cost. The clean burning property of the material causes the disposability of the jacket to be more environmentally acceptable than if the jacket were made of a less cleanly burning material. Because the jacket and bladder are non-integral, it is of no consequence that the materials of which they are made cannot be heat welded to each other.

Although this disclosure refers to specific embodiments, it will be understood by those skilled in the art that various changes in form and detail may be made without departing from the subject matter set forth in the accompanying claims.

We claim:

1. A blood pressure cuff, comprising:
   a bladder assembly comprised of:
      a stretchable first sheet, the first sheet characterized by a first material composition that includes a first material, the first sheet extending, along a longitudinal axis of the blood pressure cuff, from a first end of the bladder assembly to a second end of the bladder assembly opposite the first end, the first end of the bladder assembly forming a first end of the blood pressure cuff, and
      a stretchable second sheet separate from the first sheet, the second sheet characterized by the first material composition of the first sheet,
      the first material being weldable to itself,
      the first sheet extending from the first end of the bladder assembly to the second end of the bladder assembly, and
      the first sheet being positioned such that the first material contacts a limb of a patient when the blood pressure cuff is wrapped around the limb;

a non-stretchable top sheet separate from the first sheet and the second sheet, the top sheet characterized by a second material composition that includes fibrous material that is non-weldable to itself, the top sheet forming an outermost surface of the blood pressure cuff when the blood pressure cuff is wrapped around the limb, the top sheet having:
  a first portion having a top sheet surface that faces and overlies the second sheet, the first portion extending, along the longitudinal axis, from the first end of the bladder assembly to the second end of the bladder assembly, and
  a tail portion integral with the first portion, the tail portion extending, along the longitudinal axis, from the second end of the bladder assembly to a second end of the blood pressure cuff opposite the first end of the blood pressure cuff; and
a bladder weld joint joining the first sheet, the second sheet, and the top sheet to each other such that the first material flows at least partially into the fibrous material about a perimeter of the bladder assembly, and the top sheet surface is unjoined to the second sheet at a location within the perimeter, the bladder weld joint forming a pressurizable compartment, the pressurizable compartment being located:
  within the perimeter, and
  between the first sheet and the second sheet.

2. The cuff of claim 1, wherein:
the first sheet comprises the first material without an additional material,
the second sheet comprises the first material without an additional material, and
the fibrous material comprises a paper-like material without an additional material, the paper-like material being melt-resistant under welding conditions conducive to melting the first material to itself.

3. The cuff of claim 1, further comprising a closure assembly configured to maintain the cuff in a sleeve configuration, the closure assembly comprised of:
an inner adhesive side configured to adhere to the first portion of the top sheet; and
an outer adhesive side configured to adhere to the tail portion of the top sheet, wherein the top sheet is radially outside of the first sheet and the second sheet when the cuff is secured in the sleeve configuration.

4. The cuff of claim 1, further comprising a port projecting through the second sheet and through the first portion of the top sheet, wherein the port is welded to the second sheet at a port weld joint that extends into the first portion of the top sheet.

5. The cuff of claim 1, further comprising a bottom sheet having at least a portion which underlies the first sheet, wherein:
the portion of the bottom sheet is formed from a second material, and the first material is weldable to the second material; and
the bladder weld joint is configured to extend into the bottom sheet and join the bottom sheet to at least the first sheet.

6. The cuff of claim 5, wherein the tail portion of the top sheet is a top sheet tail portion, and the bottom sheet includes a bottom sheet tail portion extending longitudinally from the second portion of the bottom sheet.

7. The cuff of claim 6, further comprising a closure assembly that holds the cuff in a sleeve configuration, the closure assembly comprised of:
a first closure element disposed on the first portion of the top sheet; and
a second closure element disposed on the bottom sheet tail portion, wherein
  the first closure element and the second closure element are configured to mate and secure the cuff in the sleeve configuration, and
  when the cuff is secured in the sleeve configuration, the top sheet is disposed radially outside of the first sheet and the second sheet.

8. The cuff of claim 7, further comprising:
a first closure weld joint extending through the first portion of the top sheet, the first closure weld joint joining the first closure element, the top sheet, and the second sheet at a perimeter of the first closure element;
an outer layer extension disposed between the top sheet and bottom sheet;
a second closure weld joint extending through the bottom sheet tail portion and into the outer layer extension, the second closure weld joint joining the second closure element, the bottom sheet, and the outer layer extension at the perimeter of the second closure element; and
an auxiliary weld joint, the auxiliary weld joint joining the bottom sheet tail portion, the outer layer extension, and the top sheet tail portion at a perimeter segment of the cuff.

9. The cuff of claim 8, further comprising a port extending through the second sheet and through the first portion of the top sheet, the port being welded to the second sheet at a port weld joint that extends into the first portion of the top sheet.

10. The cuff of claim 7, further comprising:
a first closure weld joint extending through the first portion of the top sheet, the first closure weld joint joining the first closure element, the top sheet, and the second sheet at a perimeter of the first closure element;
an inner layer extension disposed between the top sheet and bottom sheet;
a second closure weld joint extending through the bottom sheet tail portion and into the inner layer extension, the second closure weld joint joining the second closure element, the bottom sheet, and the inner layer extension at the perimeter of the second closure element; and
an auxiliary weld joint, the auxiliary weld joint joining the bottom sheet tail portion, the inner layer extension, and the top sheet tail portion at a perimeter segment of the cuff.

11. The cuff of claim 10, further comprising a port extending through the second sheet and through the first portion of the top sheet, the port being welded to the second sheet at a port weld joint that extends into the first portion of the top sheet.

12. The cuff of claim 7, further comprising:
a first closure weld joint extending through the first portion of the top sheet, the first closure weld joint joining the first closure element, the top sheet, and the second sheet at a perimeter of the first closure element;
an inner layer extension disposed between the top sheet and the bottom sheet;
an outer layer extension disposed between the top sheet and the bottom sheet;
a second closure weld joint extending through the bottom sheet tail portion and into the inner layer extension, the second closure weld joint joining the second closure element, the bottom sheet, and the inner layer extension at the perimeter of the second closure element; and
an auxiliary weld joint, the auxiliary weld joint joining the bottom sheet tail portion, the inner layer extension, the outer layer extension, and the top sheet tail portion at a perimeter segment of the cuff.

13. The cuff of claim 12, further comprising a port extending through the second sheet and through the first portion of the top sheet, the port being welded to the second sheet at a port weld joint that extends into the first portion of the top sheet.

* * * * *